United States Patent
Ranjan et al.

(10) Patent No.: US 12,406,218 B2
(45) Date of Patent: Sep. 2, 2025

(54) DASHBOARD FOR MULTI SITE MANAGEMENT SYSTEM

(71) Applicant: Honeywell International Inc., Charlotte, NC (US)

(72) Inventors: Prabhat Ranjan, Bangalore (IN); Khushrav Writer, Charlotte, NC (US); Nithin Yadalla Ramgopal, Bangalore (IN); Gutha Stalin Sanghamitra, Bangalore (IN); Zhongshengyun Gao, Shanghai (CN); Foong Yeen Chan, Petaling Jaya (MY); Sherene Kuruvilla, Charlotte, NC (US); Ashu Rawat, Redmond, WA (US); Nitish Chopra, Janakpuri (IN); Gunjan Chanduka, Bangalore (IN); Barnali Chetia, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/121,357

(22) Filed: Mar. 14, 2023

(65) Prior Publication Data
US 2023/0213923 A1 Jul. 6, 2023

Related U.S. Application Data

(63) Continuation of application No. 17/345,955, filed on Jun. 11, 2021, now abandoned.
(Continued)

(51) Int. Cl.
*G06Q 10/0639* (2023.01)
*G05B 13/02* (2006.01)
(Continued)

(52) U.S. Cl.
CPC ......... *G06Q 10/0639* (2013.01); *G05B 13/02* (2013.01); *G05B 23/0216* (2013.01);
(Continued)

(58) Field of Classification Search
CPC ..... G06Q 10/06312; G06Q 10/063114; G06Q 10/0639; G06Q 10/0637; G06Q 10/063;
(Continued)

(56) References Cited

U.S. PATENT DOCUMENTS

| 191,512 | A | 6/1877 | Bennett et al. |
| 4,009,647 | A | 3/1977 | Howorth |

(Continued)

FOREIGN PATENT DOCUMENTS

| AU | 2010245746 A1 * | 12/2011 | ............. G05B 15/02 |
| CA | 2387100 A1 | 11/2003 | |

(Continued)

OTHER PUBLICATIONS

Johnson Controls, (2019 Smart Buildings: Solutions for Digital Transformation from Johnson Controls) https://www.youtube.com/watch?v=JEVO-x2iAzU (Year: 2019).*

(Continued)

*Primary Examiner* — Patricia H Munson
*Assistant Examiner* — Thea Labogin
(74) *Attorney, Agent, or Firm* — Seager, Tufte & Wickhem, LLP

(57) ABSTRACT

A multi-site Building Management System (BMS) monitors performance of a local BMS at each of a plurality of remote sites. The multi-site BMS includes a controller that is configured to determine a plurality of local performance metrics associated with each local BMS based on the operational data received from each local BMS and to aggregate like ones of the plurality of local performance metrics, resulting in a plurality of aggregated performance (Continued)

metrics. The controller is configured to display on the display a plurality of panels, to display in each of the plurality of panels the corresponding one of the plurality of aggregated performance metrics and to display in each of the plurality of panels a ranking of one or more of the remote sites by their corresponding local performance metric.

14 Claims, 11 Drawing Sheets

Related U.S. Application Data

(60) Provisional application No. 63/039,373, filed on Jun. 15, 2020.

(51) Int. Cl.
| | |
|---|---|
| *G05B 23/02* | (2006.01) |
| *G06Q 10/0631* | (2023.01) |
| *G06Q 10/0633* | (2023.01) |
| *G06Q 10/0637* | (2023.01) |
| *H04L 12/12* | (2006.01) |
| *H04L 12/28* | (2006.01) |

(52) U.S. Cl.
CPC .......... *G06Q 10/063114* (2013.01); *G06Q 10/06312* (2013.01); *G06Q 10/0633* (2013.01); *G06Q 10/0637* (2013.01); *H04L 12/12* (2013.01); *H04L 12/2818* (2013.01)

(58) Field of Classification Search
CPC .. G05B 23/0216; H04L 12/12; H04L 12/2818
See application file for complete search history.

(56) References Cited

U.S. PATENT DOCUMENTS

| | | | |
|---|---|---|---|
| 4,375,637 A | 3/1983 | Desjardins |
| 4,918,615 A | 4/1990 | Suzuki et al. |
| 4,939,922 A | 7/1990 | Smalley et al. |
| 5,566,084 A | 10/1996 | Cmar |
| 5,727,579 A | 3/1998 | Chardack |
| 5,745,126 A | 4/1998 | Jain et al. |
| 5,751,916 A | 5/1998 | Kon et al. |
| 5,777,598 A | 7/1998 | Gowda et al. |
| 5,973,662 A | 10/1999 | Singers et al. |
| 6,065,842 A | 5/2000 | Fink |
| 6,139,177 A | 10/2000 | Venkatraman et al. |
| 6,144,993 A | 11/2000 | Fukunaga et al. |
| 6,157,943 A | 12/2000 | Meyer |
| 6,229,429 B1 | 5/2001 | Horon |
| 6,238,337 B1 | 5/2001 | Kambhatla et al. |
| 6,334,211 B1 | 12/2001 | Kojima et al. |
| 6,353,853 B1 | 3/2002 | Gravlin |
| 6,369,695 B2 | 4/2002 | Horon |
| 6,375,038 B1 | 4/2002 | Daansen et al. |
| 6,429,868 B1 | 8/2002 | Dehner, Jr. et al. |
| 6,473,084 B1 | 10/2002 | Phillips et al. |
| 6,487,457 B1 | 11/2002 | Hull et al. |
| 6,580,950 B1 | 6/2003 | Johnson et al. |
| 6,598,056 B1 | 7/2003 | Hull et al. |
| 6,619,555 B2 | 9/2003 | Rosen |
| 6,704,012 B1 | 3/2004 | Lefave |
| 6,720,874 B2 | 4/2004 | Fufido et al. |
| 6,741,915 B2 | 5/2004 | Poth |
| 6,796,896 B2 | 9/2004 | Laiti |
| 6,801,199 B1 | 10/2004 | Wallman |
| 6,816,878 B1 | 11/2004 | Zimmers et al. |
| 6,876,951 B2 | 4/2005 | Skidmore et al. |
| 6,882,278 B2 | 4/2005 | Winings et al. |
| 6,904,385 B1 | 6/2005 | Budike, Jr. |
| 6,907,387 B1 | 6/2005 | Reardon |
| 6,911,177 B2 | 6/2005 | Deal |
| 6,993,403 B1 | 1/2006 | Dadebo et al. |
| 6,993,417 B2 | 1/2006 | Osann, Jr. |
| 7,023,440 B1 | 4/2006 | Havekost et al. |
| 7,031,880 B1 | 4/2006 | Seem et al. |
| 7,062,722 B1 | 6/2006 | Carlin et al. |
| 7,110,843 B2 | 9/2006 | Pagnano et al. |
| 7,139,685 B2 | 11/2006 | Bascle et al. |
| 7,164,972 B2 | 1/2007 | Imhof et al. |
| 7,183,899 B2 | 2/2007 | Behnke |
| 7,200,639 B1 | 4/2007 | Yoshida |
| 7,222,111 B1 | 5/2007 | Budike, Jr. |
| 7,222,800 B2 | 5/2007 | Wruck |
| 7,257,397 B2 | 8/2007 | Shamoon et al. |
| 7,280,030 B1 | 10/2007 | Monaco |
| 7,292,908 B2 | 11/2007 | Borne et al. |
| 7,295,116 B2 | 11/2007 | Kumar et al. |
| 7,302,313 B2 | 11/2007 | Sharp et al. |
| 7,308,323 B2 | 12/2007 | Kruk et al. |
| 7,308,388 B2 | 12/2007 | Beverina et al. |
| 7,313,447 B2 | 12/2007 | Hsiung et al. |
| 7,346,433 B2 | 3/2008 | Budike, Jr. |
| 7,356,548 B1 | 4/2008 | Culp et al. |
| 7,379,782 B1 | 5/2008 | Cocco |
| 7,383,148 B2 | 6/2008 | Ahmed |
| 7,434,742 B2 | 10/2008 | Mueller et al. |
| 7,447,333 B1 | 11/2008 | Masticola et al. |
| 7,466,224 B2 | 12/2008 | Ward et al. |
| 7,496,472 B2 | 2/2009 | Seem |
| 7,512,450 B2 | 3/2009 | Ahmed |
| 7,516,490 B2 | 4/2009 | Riordan et al. |
| 7,548,833 B2 | 6/2009 | Ahmed |
| 7,551,092 B1 | 6/2009 | Henry |
| 7,557,729 B2 | 7/2009 | Hubbard et al. |
| 7,567,844 B2 | 7/2009 | Thomas et al. |
| 7,596,473 B2 | 9/2009 | Hansen et al. |
| 7,610,910 B2 | 11/2009 | Ahmed |
| 7,626,507 B2 | 12/2009 | LaCasse |
| 7,664,574 B2 | 2/2010 | Imhof et al. |
| 7,682,464 B2 | 3/2010 | Glenn et al. |
| 7,702,421 B2 | 4/2010 | Sullivan et al. |
| 7,729,882 B2 | 6/2010 | Seem |
| 7,755,494 B2 | 7/2010 | Melker et al. |
| 7,761,310 B2 | 7/2010 | Rodgers |
| 7,774,227 B2 | 8/2010 | Srivastava |
| 7,797,188 B2 | 9/2010 | Srivastava |
| 7,819,136 B1 | 10/2010 | Eddy |
| 7,822,806 B2 | 10/2010 | Frank et al. |
| 7,856,370 B2 | 12/2010 | Katta et al. |
| 7,978,083 B2 | 7/2011 | Melker et al. |
| 7,984,384 B2 | 7/2011 | Chaudhri et al. |
| 7,986,323 B2 | 7/2011 | Kobayashi et al. |
| 8,024,666 B2 | 9/2011 | Thompson |
| 8,086,047 B2 | 12/2011 | Penke et al. |
| 8,099,178 B2 | 1/2012 | Mairs et al. |
| 8,151,280 B2 | 4/2012 | Sather et al. |
| 8,176,095 B2 | 5/2012 | Murray et al. |
| 8,218,871 B2 | 7/2012 | Angell et al. |
| 8,219,660 B2 | 7/2012 | McCoy et al. |
| 8,271,941 B2 | 9/2012 | Zhang et al. |
| 8,294,585 B2 | 10/2012 | Barnhill |
| 8,302,020 B2 | 10/2012 | Louch et al. |
| 8,320,634 B2 | 11/2012 | Deutsch |
| 8,334,422 B2 | 12/2012 | Gutsol et al. |
| 8,344,893 B1 | 1/2013 | Drammeh |
| 8,375,118 B2 | 2/2013 | Hao et al. |
| 8,473,080 B2 | 6/2013 | Seem et al. |
| 8,476,590 B2 | 7/2013 | Stratmann et al. |
| 8,516,016 B2 | 8/2013 | Park et al. |
| 8,558,660 B2 | 10/2013 | Nix et al. |
| 8,639,527 B2 | 1/2014 | Rensvold et al. |
| 8,698,637 B2 | 4/2014 | Raichman |
| 8,816,860 B2 | 8/2014 | Ophardt et al. |
| 8,869,027 B2 | 10/2014 | Louch et al. |
| 8,904,497 B2 | 12/2014 | Hsieh |
| 8,936,944 B2 | 1/2015 | Peltz et al. |
| 8,947,437 B2 | 2/2015 | Garr et al. |
| 8,950,019 B2 | 2/2015 | Loberger et al. |
| 9,000,926 B2 | 4/2015 | Hollock et al. |
| 9,002,532 B2 | 4/2015 | Asmus |
| 9,030,325 B2 | 5/2015 | Taneff |

(56) References Cited

U.S. PATENT DOCUMENTS

| | | |
|---|---|---|
| 9,098,738 B2 | 8/2015 | Bilet et al. |
| 9,105,071 B2 | 8/2015 | Fletcher et al. |
| 9,175,356 B2 | 11/2015 | Peltz et al. |
| 9,235,657 B1 | 1/2016 | Wenzel et al. |
| 9,240,111 B2 | 1/2016 | Scott et al. |
| 9,256,702 B2 | 2/2016 | Elbsat et al. |
| 9,280,884 B1 | 3/2016 | Schultz et al. |
| 9,292,972 B2 | 3/2016 | Hailemariam et al. |
| 9,311,807 B2 | 4/2016 | Schultz et al. |
| 9,320,662 B2 | 4/2016 | Hayes et al. |
| 9,322,566 B2 | 4/2016 | Wenzel et al. |
| 9,355,069 B2 | 5/2016 | Elbsat et al. |
| 9,370,600 B1 | 6/2016 | DuPuis et al. |
| 9,373,242 B1 | 6/2016 | Conrad et al. |
| 9,396,638 B2 | 7/2016 | Wildman et al. |
| 9,406,212 B2 | 8/2016 | De Luca et al. |
| 9,418,535 B1 | 8/2016 | Felch et al. |
| 9,418,536 B1 | 8/2016 | Felch et al. |
| 9,436,179 B1 | 9/2016 | Turney et al. |
| 9,447,985 B2 | 9/2016 | Johnson, Jr. |
| 9,449,219 B2 | 9/2016 | Bilet et al. |
| 9,477,543 B2 | 10/2016 | Henley et al. |
| 9,497,832 B2 | 11/2016 | Verberkt et al. |
| 9,513,364 B2 | 12/2016 | Hall et al. |
| 9,526,380 B2 | 12/2016 | Hamilton et al. |
| 9,526,806 B2 | 12/2016 | Park et al. |
| 9,536,415 B2 | 1/2017 | De Luca et al. |
| 9,558,648 B2 | 1/2017 | Douglas |
| 9,568,204 B2 | 2/2017 | Asmus et al. |
| 9,581,985 B2 | 2/2017 | Walser et al. |
| 9,591,267 B2 | 3/2017 | Lipton et al. |
| 9,606,520 B2 | 3/2017 | Noboa et al. |
| 9,612,601 B2 | 4/2017 | Beyhaghi et al. |
| 9,613,518 B2 | 4/2017 | Dunn et al. |
| 9,618,224 B2 | 4/2017 | Emmons et al. |
| 9,640,059 B2 | 5/2017 | Hyland |
| 9,672,360 B2 | 6/2017 | Barkan |
| 9,696,054 B2 | 7/2017 | Asmus |
| 9,710,700 B2 | 7/2017 | Bilet et al. |
| 9,715,242 B2 | 7/2017 | Pillai et al. |
| 9,721,452 B2 | 8/2017 | Felch et al. |
| 9,729,945 B2 | 8/2017 | Schultz et al. |
| 9,778,639 B2 | 10/2017 | Boettcher et al. |
| 9,784,464 B2 | 10/2017 | Yamamoto et al. |
| 9,798,336 B2 | 10/2017 | Przybylski |
| 9,843,743 B2 | 12/2017 | Lewis et al. |
| 9,852,481 B1 | 12/2017 | Turney et al. |
| 9,856,634 B2 | 1/2018 | Rodenbeck et al. |
| 9,872,088 B2 | 1/2018 | Fadell et al. |
| 9,875,639 B2 | 1/2018 | Bone et al. |
| 9,911,312 B2 | 3/2018 | Wildman et al. |
| 9,940,819 B2 | 4/2018 | Ferniany |
| 9,956,306 B2 | 5/2018 | Brais et al. |
| 9,982,903 B1 | 5/2018 | Ridder et al. |
| 9,986,175 B2 | 5/2018 | Frank et al. |
| 10,007,259 B2 | 6/2018 | Turney et al. |
| 10,055,114 B2 | 8/2018 | Shah et al. |
| 10,087,608 B2 | 10/2018 | Dobizl et al. |
| 10,101,730 B2 | 10/2018 | Wenzel et al. |
| 10,101,731 B2 | 10/2018 | Asmus et al. |
| 10,175,681 B2 | 1/2019 | Wenzel et al. |
| 10,222,083 B2 | 3/2019 | Drees et al. |
| 10,223,894 B2 | 3/2019 | Raichman |
| 10,228,837 B2 | 3/2019 | Hua et al. |
| 10,235,865 B2 | 3/2019 | Thyroff |
| 10,251,610 B2 | 4/2019 | Parthasarathy et al. |
| 10,282,796 B2 | 5/2019 | Elbsat et al. |
| 10,288,306 B2 | 5/2019 | Ridder et al. |
| 10,303,843 B2 | 5/2019 | Bitran et al. |
| 10,317,864 B2 | 6/2019 | Boettcher et al. |
| 10,332,382 B2 | 6/2019 | Thyroff |
| 10,341,132 B2 * | 7/2019 | Schubert ................ H04L 12/28 |
| 10,359,748 B2 | 7/2019 | Elbsat et al. |
| 10,386,820 B2 | 8/2019 | Wenzel et al. |
| 10,402,767 B2 | 9/2019 | Noboa et al. |
| 10,514,178 B2 | 12/2019 | Willmott et al. |
| 10,514,817 B2 | 12/2019 | Hua et al. |
| 10,520,210 B2 | 12/2019 | Park et al. |
| 10,544,955 B2 | 1/2020 | Przybylski |
| 10,558,178 B2 | 2/2020 | Wilmott et al. |
| 10,559,180 B2 | 2/2020 | Pourmohammad et al. |
| 10,559,181 B2 | 2/2020 | Pourmohammad et al. |
| 10,565,844 B2 | 2/2020 | Pourmohammad et al. |
| 10,600,263 B2 | 3/2020 | Park et al. |
| 10,602,474 B2 | 3/2020 | Goldstein |
| 10,605,477 B2 | 3/2020 | Ridder |
| 10,607,147 B2 | 3/2020 | Raykov et al. |
| 10,619,882 B2 | 4/2020 | Chatterjee et al. |
| 10,627,124 B2 | 4/2020 | Walser et al. |
| 10,673,380 B2 | 6/2020 | Wenzel et al. |
| 10,678,227 B2 | 6/2020 | Przybylski et al. |
| 10,706,375 B2 | 7/2020 | Wenzel et al. |
| 10,726,711 B2 | 7/2020 | Subramanian et al. |
| 10,732,584 B2 | 8/2020 | Elbsat et al. |
| 10,767,885 B2 | 9/2020 | Przybylski et al. |
| 10,775,988 B2 | 9/2020 | Narain et al. |
| 10,796,554 B2 | 10/2020 | Vincent et al. |
| 10,809,682 B2 | 10/2020 | Patil et al. |
| 10,809,705 B2 | 10/2020 | Przybylski |
| 10,824,125 B2 | 11/2020 | Elbsat et al. |
| 10,854,194 B2 | 12/2020 | Park et al. |
| 10,871,298 B2 | 12/2020 | Ridder et al. |
| 10,871,756 B2 | 12/2020 | Johnson, Jr. et al. |
| 10,876,754 B2 | 12/2020 | Wenzel et al. |
| 10,890,904 B2 | 1/2021 | Turney et al. |
| 10,900,686 B2 | 1/2021 | Willmott et al. |
| 10,901,446 B2 | 1/2021 | Nesler et al. |
| 10,908,578 B2 | 2/2021 | Johnson, Jr. et al. |
| 10,909,642 B2 | 2/2021 | Elbsat et al. |
| 10,915,094 B2 | 2/2021 | Wenzel et al. |
| 10,917,740 B1 | 2/2021 | Scott et al. |
| 10,921,768 B2 | 2/2021 | Johnson, Jr. et al. |
| 10,921,972 B2 | 2/2021 | Park et al. |
| 10,921,973 B2 | 2/2021 | Park et al. |
| 10,928,790 B2 | 2/2021 | Mueller et al. |
| 10,948,884 B2 | 3/2021 | Beaty et al. |
| 10,949,777 B2 | 3/2021 | Elbsat et al. |
| 10,955,800 B2 | 3/2021 | Burroughs et al. |
| 10,956,627 B1 * | 3/2021 | Eckenrode ............ G06Q 50/16 |
| 10,956,842 B2 | 3/2021 | Wenzel et al. |
| 10,962,945 B2 | 3/2021 | Park et al. |
| 10,969,135 B2 | 4/2021 | Willmott et al. |
| 11,002,457 B2 | 5/2021 | Turney et al. |
| 11,009,252 B2 | 5/2021 | Turney et al. |
| 11,010,846 B2 | 5/2021 | Elbsat et al. |
| 11,016,648 B2 | 5/2021 | Fala et al. |
| 11,016,998 B2 | 5/2021 | Park et al. |
| 11,022,947 B2 | 6/2021 | Elbsat et al. |
| 11,024,292 B2 | 6/2021 | Park et al. |
| 11,036,249 B2 | 6/2021 | Elbsat |
| 11,038,709 B2 | 6/2021 | Park et al. |
| 11,042,139 B2 | 6/2021 | Deshpande et al. |
| 11,042,924 B2 | 6/2021 | Asmus et al. |
| 11,061,424 B2 | 7/2021 | Elbsat et al. |
| 11,068,821 B2 | 7/2021 | Wenzel et al. |
| 11,070,389 B2 | 7/2021 | Schuster et al. |
| 11,073,976 B2 | 7/2021 | Park et al. |
| 11,080,289 B2 | 8/2021 | Park et al. |
| 11,080,426 B2 | 8/2021 | Park et al. |
| 11,086,276 B2 | 8/2021 | Wenzel et al. |
| 11,094,186 B2 | 8/2021 | Razak |
| 11,108,587 B2 | 8/2021 | Park et al. |
| 11,113,295 B2 | 9/2021 | Park et al. |
| 11,119,458 B2 | 9/2021 | Asp et al. |
| 11,120,012 B2 | 9/2021 | Park et al. |
| 11,131,473 B2 | 9/2021 | Risbeck et al. |
| 11,150,617 B2 | 10/2021 | Ploegert et al. |
| 11,151,983 B2 | 10/2021 | Park et al. |
| 11,156,978 B2 | 10/2021 | Johnson, Jr. et al. |
| 11,156,996 B2 | 10/2021 | Schuster et al. |
| 11,158,306 B2 | 10/2021 | Park et al. |
| 11,182,047 B2 | 11/2021 | Nayak et al. |
| 11,195,401 B2 | 12/2021 | Pourmohammad |
| 11,217,087 B2 | 1/2022 | Pelski |

(56) References Cited

U.S. PATENT DOCUMENTS

| | | | |
|---|---|---|---|
| 11,226,126 B2 | 1/2022 | Przybylski et al. | |
| 11,243,523 B2 | 2/2022 | Llopis et al. | |
| 11,268,715 B2 | 3/2022 | Park et al. | |
| 11,268,996 B2 | 3/2022 | Vitullo et al. | |
| 11,269,505 B2 | 3/2022 | Fala et al. | |
| 11,272,011 B1 | 3/2022 | Laughton et al. | |
| 11,272,316 B2 | 3/2022 | Scott et al. | |
| 11,275,348 B2 | 3/2022 | Park et al. | |
| 11,275,363 B2 | 3/2022 | Przybylski et al. | |
| 11,281,169 B2 | 3/2022 | Chatterjee et al. | |
| 11,288,754 B2 | 3/2022 | Elbsat et al. | |
| 11,314,726 B2 | 4/2022 | Park et al. | |
| 11,314,788 B2 | 4/2022 | Park et al. | |
| 11,334,044 B2 | 5/2022 | Goyal | |
| 11,353,834 B2 | 6/2022 | Mueller et al. | |
| 11,356,292 B2 | 6/2022 | Ploegert et al. | |
| 11,360,451 B2 | 6/2022 | Pancholi | |
| 11,361,123 B2 | 6/2022 | Ploegert | |
| 11,616,391 B2 * | 3/2023 | Park | H02J 3/14 700/286 |
| 11,888,093 B2 | 1/2024 | Zhang et al. | |
| 2002/0111698 A1 | 8/2002 | Graziano et al. | |
| 2002/0130868 A1 | 9/2002 | Smith | |
| 2003/0028269 A1 | 2/2003 | Spriggs et al. | |
| 2003/0030637 A1 | 2/2003 | Grinstein et al. | |
| 2003/0046862 A1 | 3/2003 | Wolf et al. | |
| 2003/0071814 A1 | 4/2003 | Jou et al. | |
| 2003/0078677 A1 | 4/2003 | Hull et al. | |
| 2003/0083957 A1 | 5/2003 | Olefson | |
| 2003/0103075 A1 | 6/2003 | Rosselot | |
| 2003/0171851 A1 | 9/2003 | Brickfield et al. | |
| 2003/0214400 A1 | 11/2003 | Mizutani et al. | |
| 2003/0233432 A1 | 12/2003 | Davis et al. | |
| 2004/0001009 A1 | 1/2004 | Winings et al. | |
| 2004/0064260 A1 | 4/2004 | Padmanabhan et al. | |
| 2004/0143474 A1 | 7/2004 | Haeberle et al. | |
| 2004/0153437 A1 | 8/2004 | Buchan | |
| 2004/0168115 A1 | 8/2004 | Bauernschmidt et al. | |
| 2004/0233192 A1 | 11/2004 | Hopper | |
| 2004/0260411 A1 | 12/2004 | Cannon | |
| 2005/0010460 A1 | 1/2005 | Mizoguchi et al. | |
| 2005/0119767 A1 | 6/2005 | Kiwimagi et al. | |
| 2005/0143863 A1 | 6/2005 | Ruane et al. | |
| 2005/0267900 A1 | 12/2005 | Ahmed et al. | |
| 2006/0004841 A1 | 1/2006 | Heikkonen et al. | |
| 2006/0009862 A1 | 1/2006 | Imhof et al. | |
| 2006/0017547 A1 | 1/2006 | Buckingham et al. | |
| 2006/0020177 A1 | 1/2006 | Seo et al. | |
| 2006/0028471 A1 | 2/2006 | Kincaid et al. | |
| 2006/0029256 A1 | 2/2006 | Miyoshi et al. | |
| 2006/0058900 A1 | 3/2006 | Johanson et al. | |
| 2006/0067545 A1 | 3/2006 | Lewis et al. | |
| 2006/0067546 A1 | 3/2006 | Lewis et al. | |
| 2006/0077255 A1 | 4/2006 | Cheng | |
| 2006/0184326 A1 | 8/2006 | McNally et al. | |
| 2006/0231568 A1 | 10/2006 | Lynn et al. | |
| 2006/0265664 A1 | 11/2006 | Simons et al. | |
| 2006/0279630 A1 | 12/2006 | Aggarwal et al. | |
| 2007/0016955 A1 | 1/2007 | Goldberg et al. | |
| 2007/0055757 A1 | 3/2007 | Mairs et al. | |
| 2007/0055760 A1 | 3/2007 | McCoy et al. | |
| 2007/0061046 A1 | 3/2007 | Mairs et al. | |
| 2007/0067062 A1 | 3/2007 | Mairs et al. | |
| 2007/0088534 A1 | 4/2007 | MacArthur et al. | |
| 2007/0090951 A1 | 4/2007 | Chan et al. | |
| 2007/0091091 A1 | 4/2007 | Gardiner et al. | |
| 2007/0101433 A1 | 5/2007 | Louch et al. | |
| 2007/0114295 A1 | 5/2007 | Jenkins | |
| 2007/0120652 A1 | 5/2007 | Behnke | |
| 2007/0139208 A1 | 6/2007 | Kates | |
| 2007/0216682 A1 | 9/2007 | Navratil et al. | |
| 2007/0219645 A1 | 9/2007 | Thomas et al. | |
| 2007/0239484 A1 | 10/2007 | Arond et al. | |
| 2007/0268122 A1 | 11/2007 | Kow et al. | |
| 2008/0001763 A1 | 1/2008 | Raja et al. | |
| 2008/0027885 A1 | 1/2008 | Van Putten et al. |
| 2008/0036593 A1 | 2/2008 | Rose-Pehrsson et al. |
| 2008/0062167 A1 | 3/2008 | Boggs et al. |
| 2008/0099045 A1 | 5/2008 | Glenn et al. |
| 2008/0103798 A1 | 5/2008 | Domenikos et al. |
| 2008/0120396 A1 | 5/2008 | Jayaram et al. |
| 2008/0144885 A1 | 6/2008 | Zucherman et al. |
| 2008/0183424 A1 | 7/2008 | Seem |
| 2008/0194009 A1 | 8/2008 | Marentis |
| 2008/0198231 A1 | 8/2008 | Ozdemir et al. |
| 2008/0209342 A1 | 8/2008 | Taylor et al. |
| 2008/0222565 A1 | 9/2008 | Taylor et al. |
| 2008/0224862 A1 | 9/2008 | Cirker |
| 2008/0242945 A1 | 10/2008 | Gugliotti et al. |
| 2008/0250800 A1 | 10/2008 | Wetzel |
| 2008/0279420 A1 | 11/2008 | Masticola et al. |
| 2008/0280275 A1 | 11/2008 | Collopy |
| 2008/0303658 A1 | 12/2008 | Melker et al. |
| 2008/0306985 A1 | 12/2008 | Murray et al. |
| 2008/0320552 A1 | 12/2008 | Kumar et al. |
| 2009/0001181 A1 | 1/2009 | Siddaramanna et al. |
| 2009/0024944 A1 | 1/2009 | Louch et al. |
| 2009/0065596 A1 | 3/2009 | Seem et al. |
| 2009/0083120 A1 | 3/2009 | Strichman et al. |
| 2009/0096791 A1 | 4/2009 | Abshear |
| 2009/0125337 A1 | 5/2009 | Abri |
| 2009/0125825 A1 | 5/2009 | Rye et al. |
| 2009/0144023 A1 | 6/2009 | Seem |
| 2009/0157744 A1 | 6/2009 | McConnell |
| 2009/0160673 A1 | 6/2009 | Cirker |
| 2009/0322782 A1 | 12/2009 | Kimchi et al. |
| 2010/0048167 A1 | 2/2010 | Chow et al. |
| 2010/0058248 A1 | 3/2010 | Park |
| 2010/0064001 A1 | 3/2010 | Daily |
| 2010/0070089 A1 | 3/2010 | Harrod et al. |
| 2010/0073162 A1 | 3/2010 | Johnson et al. |
| 2010/0123560 A1 | 5/2010 | Nix et al. |
| 2010/0134296 A1 | 6/2010 | Hwang |
| 2010/0156628 A1 | 6/2010 | Ainsbury et al. |
| 2010/0156630 A1 | 6/2010 | Ainsbury |
| 2010/0188228 A1 | 7/2010 | Hyland |
| 2010/0223198 A1 | 9/2010 | Noureldin et al. |
| 2010/0249955 A1 | 9/2010 | Sitton |
| 2010/0286937 A1 | 11/2010 | Hedley et al. |
| 2010/0318200 A1 | 12/2010 | Foslien et al. |
| 2010/0324962 A1 | 12/2010 | Nesler et al. |
| 2011/0010654 A1 | 1/2011 | Raymond et al. |
| 2011/0057799 A1 | 3/2011 | Taneff |
| 2011/0077779 A1 | 3/2011 | Fuller et al. |
| 2011/0083094 A1 | 4/2011 | Laycock et al. |
| 2011/0087988 A1 | 4/2011 | Ray et al. |
| 2011/0112854 A1 | 5/2011 | Koch et al. |
| 2011/0126111 A1 | 5/2011 | Gill et al. |
| 2011/0154426 A1 | 6/2011 | Doser et al. |
| 2011/0161124 A1 | 6/2011 | Lappinga et al. |
| 2011/0169646 A1 | 7/2011 | Raichman |
| 2011/0184563 A1 | 7/2011 | Foslien et al. |
| 2011/0202467 A1 | 8/2011 | Hilber et al. |
| 2011/0273298 A1 | 11/2011 | Snodgrass et al. |
| 2011/0291841 A1 | 12/2011 | Hollock et al. |
| 2011/0298301 A1 | 12/2011 | Wong et al. |
| 2011/0316703 A1 | 12/2011 | Butler et al. |
| 2011/0320054 A1 | 12/2011 | Brzezowski |
| 2012/0022700 A1 | 1/2012 | Drees et al. |
| 2012/0039503 A1 | 2/2012 | Chen et al. |
| 2012/0062382 A1 | 3/2012 | Taneff |
| 2012/0075464 A1 | 3/2012 | Derenne et al. |
| 2012/0109988 A1 | 5/2012 | Li et al. |
| 2012/0112883 A1 | 5/2012 | Wallace et al. |
| 2012/0131217 A1 | 5/2012 | Delorme et al. |
| 2012/0158185 A1 | 6/2012 | El-Mankabady et al. |
| 2012/0216243 A1 | 8/2012 | Gill et al. |
| 2012/0224057 A1 | 9/2012 | Gill et al. |
| 2012/0259466 A1 | 10/2012 | Ray et al. |
| 2012/0262472 A1 | 10/2012 | Garr et al. |
| 2012/0272146 A1 | 10/2012 | D'souza et al. |
| 2012/0291068 A1 | 11/2012 | Khushoo et al. |
| 2012/0303652 A1 | 11/2012 | Tseng |
| 2012/0310418 A1 | 12/2012 | Harrod et al. |

(56) References Cited

U.S. PATENT DOCUMENTS

| | | |
|---|---|---|
| 2013/0055132 A1 | 2/2013 | Foslien |
| 2013/0060794 A1 | 3/2013 | Puttabasappa et al. |
| 2013/0082842 A1 | 4/2013 | Balazs et al. |
| 2013/0086152 A1 | 4/2013 | Hersche et al. |
| 2013/0091631 A1 | 4/2013 | Hayes et al. |
| 2013/0110295 A1 | 5/2013 | Zheng et al. |
| 2013/0169681 A1 | 7/2013 | Rasane et al. |
| 2013/0184880 A1 | 7/2013 | McMahon |
| 2013/0187775 A1 | 7/2013 | Marsden et al. |
| 2013/0204402 A1 | 8/2013 | Mezic et al. |
| 2013/0204570 A1 | 8/2013 | Mendelson et al. |
| 2013/0229276 A1 | 9/2013 | Hunter |
| 2013/0268293 A1 | 10/2013 | Knudson et al. |
| 2013/0289774 A1 | 10/2013 | Day et al. |
| 2014/0032157 A1 | 1/2014 | Khiani |
| 2014/0040998 A1 | 2/2014 | Hsieh |
| 2014/0046490 A1 | 2/2014 | Foslien et al. |
| 2014/0046722 A1 | 2/2014 | Rosenbloom et al. |
| 2014/0058539 A1 | 2/2014 | Park |
| 2014/0167917 A2 | 6/2014 | Wallace et al. |
| 2014/0207291 A1 | 7/2014 | Golden et al. |
| 2014/0292518 A1 | 10/2014 | Wildman et al. |
| 2014/0307076 A1 | 10/2014 | Deutsch |
| 2014/0309757 A1 | 10/2014 | Le Sant et al. |
| 2014/0316582 A1 | 10/2014 | Berg-Sonne et al. |
| 2014/0320289 A1 | 10/2014 | Raichman |
| 2014/0342724 A1 | 11/2014 | Hill et al. |
| 2015/0025329 A1 | 1/2015 | Amarasingham et al. |
| 2015/0032264 A1 | 1/2015 | Emmons et al. |
| 2015/0056909 A1 | 2/2015 | Chien |
| 2015/0070174 A1 | 3/2015 | Douglas |
| 2015/0077258 A1 | 3/2015 | Nelson et al. |
| 2015/0113462 A1 | 4/2015 | Chen et al. |
| 2015/0153918 A1 | 6/2015 | Chen et al. |
| 2015/0161874 A1 | 6/2015 | Thyroff et al. |
| 2015/0167995 A1 | 6/2015 | Fadell et al. |
| 2015/0168949 A1 | 6/2015 | Hua et al. |
| 2015/0194043 A1 | 7/2015 | Dunn et al. |
| 2015/0198707 A1 | 7/2015 | Al-Alusi |
| 2015/0212717 A1 | 7/2015 | Nair et al. |
| 2015/0213222 A1 | 7/2015 | Amarasingham et al. |
| 2015/0213379 A1 | 7/2015 | Nair et al. |
| 2015/0216369 A1 | 8/2015 | Hamilton et al. |
| 2015/0253748 A1 | 9/2015 | Brun et al. |
| 2015/0281287 A1 | 10/2015 | Gill et al. |
| 2016/0061473 A1 | 3/2016 | Johnson, Jr. |
| 2016/0061476 A1 | 3/2016 | Schultz et al. |
| 2016/0061477 A1 | 3/2016 | Schultz et al. |
| 2016/0061794 A1 | 3/2016 | Schultz et al. |
| 2016/0061795 A1 | 3/2016 | Schultz et al. |
| 2016/0063833 A1 | 3/2016 | Schultz et al. |
| 2016/0066067 A1 | 3/2016 | Schultz et al. |
| 2016/0116181 A1 | 4/2016 | Aultman et al. |
| 2016/0139067 A1 | 5/2016 | Grace |
| 2016/0253897 A1 | 9/2016 | Wildman et al. |
| 2016/0255516 A1 | 9/2016 | Hill et al. |
| 2016/0298864 A1 | 10/2016 | Ekolind et al. |
| 2016/0306934 A1 | 10/2016 | Sperry et al. |
| 2016/0314683 A1 | 10/2016 | Felch et al. |
| 2016/0328948 A1 | 11/2016 | Ferniany |
| 2016/0335731 A1 | 11/2016 | Hall |
| 2016/0367925 A1 | 12/2016 | Blackley |
| 2017/0024986 A1 | 1/2017 | Austin |
| 2017/0075323 A1* | 3/2017 | Shrivastava ............ G06Q 50/10 |
| 2017/0193792 A1 | 7/2017 | Bermudez Rodriguez et al. |
| 2017/0256155 A1 | 9/2017 | Sengstaken, Jr. |
| 2017/0264493 A1 | 9/2017 | Cencini et al. |
| 2017/0280949 A1 | 10/2017 | Wildman et al. |
| 2017/0294106 A1 | 10/2017 | Thyroff |
| 2017/0365024 A1 | 12/2017 | Koch et al. |
| 2018/0016773 A1 | 1/2018 | Chandler et al. |
| 2018/0046149 A1 | 2/2018 | Ahmed |
| 2018/0151054 A1 | 5/2018 | Pi |
| 2018/0218591 A1 | 8/2018 | Easter |
| 2018/0259927 A1 | 9/2018 | Przybylski et al. |
| 2018/0293038 A1 | 10/2018 | Meruva et al. |
| 2018/0301014 A1 | 10/2018 | Worral et al. |
| 2018/0313695 A1 | 11/2018 | Shim et al. |
| 2018/0365957 A1 | 12/2018 | Wright et al. |
| 2019/0051138 A1 | 2/2019 | Easter |
| 2019/0139395 A1 | 5/2019 | Rogachev et al. |
| 2019/0146430 A1* | 5/2019 | Chatterjee ............... F24F 3/001 700/275 |
| 2019/0209719 A1 | 7/2019 | Andersen et al. |
| 2020/0009280 A1 | 1/2020 | Kupa et al. |
| 2020/0074836 A1 | 3/2020 | Kolavennu et al. |
| 2020/0090089 A1 | 3/2020 | Aston et al. |
| 2020/0146557 A1 | 5/2020 | Cheung et al. |
| 2020/0200420 A1 | 6/2020 | Nayak et al. |
| 2020/0256571 A1 | 8/2020 | Johnson, Jr. et al. |
| 2021/0010701 A1 | 1/2021 | Suindykov et al. |
| 2021/0011443 A1 | 1/2021 | Mcnamara |
| 2021/0011444 A1 | 1/2021 | Risbeck et al. |
| 2021/0302799 A1* | 9/2021 | Khanna ................ G05B 19/042 |
| 2021/0356927 A1 | 11/2021 | Johnson, Jr. et al. |
| 2021/0364181 A1 | 11/2021 | Risbeck et al. |
| 2021/0373519 A1 | 12/2021 | Risbeck et al. |
| 2022/0011731 A1 | 1/2022 | Risbeck et al. |
| 2022/0113045 A1 | 4/2022 | Gamroth et al. |
| 2022/0137580 A1 | 5/2022 | Burroughs et al. |

FOREIGN PATENT DOCUMENTS

| | | |
|---|---|---|
| CA | 2538139 A1 | 3/2005 |
| CN | 103110410 A | 5/2013 |
| CN | 103970977 A | 8/2014 |
| CN | 105116848 A | 12/2015 |
| CN | 108961714 A | 12/2018 |
| CN | 110009245 A | 7/2019 |
| CN | 110084928 A | 8/2019 |
| CN | 110827457 A | 2/2020 |
| EP | 1669912 A1 | 6/2006 |
| EP | 2310981 A1 | 4/2011 |
| JP | 7085166 A | 3/1995 |
| JP | 11024735 A | 1/1999 |
| JP | 11317936 A | 11/1999 |
| JP | 2001356813 A | 12/2001 |
| JP | 2005242531 A | 9/2005 |
| JP | 2005311563 A | 11/2005 |
| KR | 1172747 B1 | 8/2012 |
| KR | 101445367 B1 | 10/2014 |
| KR | 1499081 B1 | 3/2015 |
| NO | 2011123743 A1 | 10/2011 |
| WO | 9621264 A3 | 11/1996 |
| WO | 2004029518 A1 | 4/2004 |
| WO | 2005045715 A2 | 5/2005 |
| WO | 2008152433 A1 | 12/2008 |
| WO | 2008157755 A1 | 12/2008 |
| WO | 2009012319 A2 | 1/2009 |
| WO | 2009079648 A1 | 6/2009 |
| WO | 2010106474 A1 | 9/2010 |
| WO | 2011025085 A1 | 3/2011 |
| WO | 2011043732 A1 | 4/2011 |
| WO | 2011057173 A2 | 5/2011 |
| WO | 2013062725 A1 | 5/2013 |
| WO | 2013178819 A1 | 12/2013 |
| WO | 2014009291 A1 | 1/2014 |
| WO | 2014098861 A1 | 6/2014 |
| WO | 2014135517 A1 | 9/2014 |
| WO | 2016123536 A1 | 8/2016 |
| WO | 2017057274 A1 | 4/2017 |
| WO | 2018089606 A1 | 5/2018 |
| WO | 2019046580 A1 | 3/2019 |
| WO | 2020024553 A1 | 2/2020 |

OTHER PUBLICATIONS

Johnson Controls, (2019 Smart Buildings: Solutions for Digital Transformation from Johnson Controls) https://www.youtube.com/watch?v=JEVO-x2iAxU (Year: 2019).*

Airedale International Air Conditioning Ltd., 2017, ACIS Building Management System (BMS) Demo with Jon Martinez https://www.youtube.com/watch?v=jj3R6U6dFkk (Year: 2017).*

(56) References Cited

OTHER PUBLICATIONS

Olgyay, Victor, (2020, Connected Communities: A Multi-Building Energy Management Approach ); www.nrel.gov/publications (Year: 2020).*
Olken et al., "Object Lessons Learned from a Distributed System for Remote Building Monitoring and Operation," ACM Sigplan Notices, vol. 33, No. 10, pp. 284-295, Oct. 1998.
Proliphix, Inc., "Proliphix IP Devices: HTTP API," 28 pages, Jan. 23, 2006.
Proliphix, Inc., "Remote Management User Guide," 12 pages, prior to Aug. 27, 2007.
Rogan et al., "Smart and Final Food Stores: A Case Study in Web Based Energy Information and Collection," Web Based Energy Information and Control Systems: Case Studies and Application, Chapter 6, p. 59-64, 2005.
Sharp, "Actius AL3DU 3D LC Display High Performance 3D Visualization," 2 pages, prior to Mar. 17, 2006.
So et al., "Building Automation on the Information Superhighway," ASHRAE Transactions, vol. 104, Part 2, pp. 176-191, 1998.
So et al., "Building Automation Systems on the Internet," Facilities vol. 15, No. 5/6, pp. 125-133, May/Jun. 1997.
Talon, "Raptor Controller," 6 pages, Oct. 2003.
Talon, "Workstation Software," 4 pages, Nov. 2002.
Trane, "System Programming, Tracer Summit Version 14, BMTW-SVP01D-EN," 623 pages, 2002.
Lucid Design Group, Inc., "Building Dashboard," 2 pages, Printed May 30, 2013.
"America's Largest Managed Security Services Provider Launches Comprehensive, Integrated Covid-19 Safety Program for Office Buildings and Suites," KastleSafeSpaces, 5 pages, May 11, 2020.
"Biometric Door Reader With Body Temperature Detection," Kintronics, 9 pages, accessed May 21, 2020.
"Body Surface Temperature Screening with Alarm Function TVS-200IS/TVS-500IS," Nippon Avionics Co., 3 pages, accessed May 21, 2020.
"BriefCam announces video analytics innovation for contact tracing, physical distancing, occupancy management and face mask detection," BriefCam LTD, 11 pages, Jun. 5, 2020.
"Thermal Imaging SmartPhone Can Be used For Temperature Screening of People," CAT, 3 pages, accessed Jul. 13, 2020.
"Contact Tracing Now Available on Identiv's Hirsch Velocity Access Control Platform," Identiv, 5 pages, May 21, 2020.
Silva et al., "Cough localization for the detection of respiratory diseases in pig houses," ScienceDirect, 7 pages, May 28, 2008.
Oey et al., "Evaluation of Isolation Compliance Using Real Time Video In Critical Care," North Shore University Hospital, 1 page, Oct. 9, 2015.
"Facial Attendace System With Temperature Screening Now In India," IANS, 5 pages, Mar. 19, 2020.
"Plan to Re-Open," EHIGH, 16 pages, accessed Jun. 13, 2020.
"How Smarter AI-Powered Cameras Can Mitigate the Spread of Wuhan Novel," AnyConnect, 22 pages, 2020.
"How to fight COVID-19 with machine learning," DataRevenue, 20 pages, accessed May 25, 2020.
Honeywell, "Inncontrol 5," 2 pages, Aug. 8, 2018.
"IP Door Access Control," Kintronics, 21 pages, 2014.
"Kogniz AI Health Response Platform," Kogniz, 9 pages, accessed May 21, 2020.
"Machine Learning Could Check If You're Social Distancing Properly at Work," MIT Technology Review, 7 pages, Apr. 17, 2020.
Punn et al., "Monitoring COVID-19 social distancing with person detection and tracking via fine-tuned YOLO v3 and Deepsort techniques," 10 pages, May 6, 2020.
Burt, "NEC launches dual face biometric and fever detection system for access control," Biometric Update, 4 pages, May 8, 2020.
"Remote temperature monitoring," AXIS Communication, 10 pages, 2014.
"FebriEye-AI Based Thermal Temperature Screening System," vehant, 1 page, 2020.

"See The World In A New Way Hikvision Thermal Cameras," Hikvision, 12 pages, 2017.
Allain, "Trying out the iPhone Infrared Camera: The FLIR One," Wired, 15 pages, 2014.
Dasgupta, "Your voice may be able to tell you if you have Covid," Hindustan Times, 4 pages, Apr. 16, 2020.
Ganguty, "Gurugram-based startup Staqu has modified AI-powered JARVIS to battle coronavirus," Yourstory, 7 pages, Mar. 31, 2020.
Trane, "Creating Input/Output Objects," 196 pages, retrieved Jul. 10, 2020.
Trane, "Using the Graphing Control Editor," 181 pages, retrieved Jul. 10, 2020.
Examination Report No. 1 for standard patent application, AU Application No. 2021204108, Australian Patent Office, May 17, 2022 (7 pages).
Johnson Controls Develops Industry-first AI Driven Digital Solution to Manage Clean Air, Energy, Sustainability, Comfort and Cost in Buildings, 7 pages, 2022. Accessed Aug. 29, 2022.
Johnson Controls and Microsoft Announce Global Collaboration, Launch Integration between Open Blue Digital Twin and Azure Digital Twins, 7 pages, 2022. Accessed Aug. 29, 2022.
Open Blue Companion Desktop User Guide, Johnson Controls, 18 pages, 2022.
Open Blue Digital Twin: Designed for Buildings. Infused with AI, Johnson Controls, 17 pages, 2022. Accessed Aug. 29, 2022.
Open Blue Enterprise Manager User Guide, Johnson Controls, Release 3.1, 72 pages, Jan. 28, 2021.
Open Blue Enterprise Manager User Guide, Johnson Controls, Release 4.0, 78pages, Nov. 29, 2021.
Open Blue Location Manager User Guide, Johnson Controls, Release 2.4.7, 28 pages, Jul. 20, 2022.
Open Blue Enterprise Manager, Optimize Building Portfolio Performance with Advanced Data Analystics and AI, Johnson Controls, 20 pages, Accessed Aug. 29, 2022.
Open Blue Platform, Make Smarter, Faster, More Data-Driven Decisions, Johnson Controls, 15 pages, 2022. Accessed Aug. 29, 2022.
Open Blue, Now, Spaces have Memory and Identity, Johnson Controls, 20 pages, 2022. Accessed Feb. 10, 2022.
Open Blue Enterprise Manager User Guide, Johnson Controls, 108 pages, Release 4.1.3, 2022, Accessed Aug. 29, 2022.
Risbeck et al; "Modeling and Multiobjective Optimization of Indoor Airborne Disease Transmission Risk and Associated Energy Consumption for Building HVAC Systems," Energy and Buildings, vol. 253, 24 pages, 2021.
Bocicor et al. "Wireless Sensor Network based System for the Prevention of Hospital Acquired Infections", arxiv.org, Cornell University Ithaca, NY 14853, May 2, 2017, XP080947042, (Abstract).
Shhedi et al., "Traditional and ICT Solutions for Preventing the Hospital Acquired Infection", 2015 20th International Conference on Control Systems and Computer Science, IEEE, May 27, 2015, pp. 867-873, XP033188038.
Extended European Search Report, EP application No. 20151295.1, pp. 13, May 26, 2020.
U.S. Appl. No. 14/109,496, filed Dec. 17, 2013.
"What is the GE Nucleus Home Manager? How can a Home Manager Help with Energy Conservation?" GE Nucleus, 2 pages, printed Jan. 15, 2013. www.geappliances.com/home-energy-manager/about-energy-monitors.htm.
"Lucid Design Group—Building Dashboard Network—Apps," 7 pages, Jan. 15, 2013. www.luciddesigngroup.com/network/apps.php#homepage.
Preuveneers et al., "Intelligent Widgets for Intuitive Interaction and Coordination in Smart Home Environments," IEEE Eighth International Conference on Intelligent Environments, pp. 157-164, 2012.
Wu et al., "A Web 2.0 Based Scientific Application Framework," 7 pages, prior to Jul. 24, 2014.
"The Home Dashboard," CRBM info@hand website, 46 pages, prior to Apr. 25, 2013.
"Free Facilities Dashboards," eSight Energy Website, 2 pages, prior to Apr. 25, 2013.
Alerton Building Controls, Gallery Prints, 7 pages, Dec. 19, 2013.

(56) References Cited

OTHER PUBLICATIONS

Carter, "Industrial Energy Management Dashboards Require a Toolkit," Cross Automation, 11 pages, Nov. 4, 2013.
U.S. Appl. No. 14/169,071, filed Jan. 30, 2014.
U.S. Appl. No. 14/169,083, filed Jan. 30, 2014.
U.S. Appl. No. 14/461,188, filed Aug. 15, 2014.
U.S. Appl. No. 14/482,607, filed Sep. 10, 2014.
e-homecontrols.com, "e-Home Controls Website," link to actual website no longer works, 1 page, prior to Dec. 19, 2013.
"C&C (/)—Omniboard," 5 pages, Dec. 19, 2013. http://www.ccbac.com.
"DomController Home Automation Software—Control Anything from Anywhere," 11 pages, printed Jan. 6, 2015. http://www.domcontroller.com/en/.
"Novar Opus Bas," 1 page, prior to Feb. 13, 2013. http://www.novar.com/ems-bas/opus-building-automation-system.
"A 3D Interactive Environment for Automated Building Control," Master's Dissertation, Instituto Superior Tecnico, 120 pages, Nov. 2012.
Panduit Corp., "Enable a Building Automation with Panduit Enterprise Solutions," 4 pages, Nov. 2012.
Honeywell, "WEBs-AX Web-Enabled Building Solutions," sales brochure, Honeywell International Inc., Mar. 2009.
Honeywell, "Attune Advisory Services," press release, Honeywell International Inc., Mar. 20, 2012.
EnteliWEB Overview, web pages retrieved on May 9, 2013 from http://deltacontrols.com/products/facilities-management/supervisory-software et seq. by the Internet Archive at web.archive.org.
"BACnet Protocol Implementation Conformance Statement" for enteliWEB, Delta Controls, Jul. 17, 2013.
Castle, "7 Software Platforms that Make Building Energy Management Easy," http://greentechadvocates.com/2012/11/28/7-software-platforms-that-make-building-energy-managment-easy/, Nov. 28, 2012.
EnteliWEB "Software: Enterprise Energy Management", catalog sheet, Delta Controls, 2012.
EnteliWEB "Software: Enterprise Energy Management", catalog sheet, Delta Controls., 2010.
"Intelligent Building Management Systems in Miami," Advanced Control Corp., Mar. 7, 2013.
"The Ohio State University," BACnet International Journal, vol. 5, p. 4, Jan. 2013.
Bobker et al., "Operational Effectiveness in Use of BAS," Proceedings of the 13th International Conference for Enhanced Building Operations, Oct. 8, 2013.
Castelo, "A 3D Interactive Environment for Automated Building Control," Elsevier, Nov. 8, 2012.
"Creston Special Report: How Intelligent building management solutions are reducing operational costs," Creston, 2012.
"Building Automation Software Solutions," Iconics, 2013.
Lacey, "The Top 10 Software Vendors Connecting Smart Buildings to the Smart Grid," http://www.greentechmedia.com/articles/read/the-top-10-companies-in-enterprise-smart-grid, Jul. 18, 2013.
"NiagraAX Product Model Overview," Tridium, Inc., 2005.
"An Overview of NiagraAX: A comprehensive software platform designed to create smart device applications," Tridium, Inc., 2005.
"Phoenix Controls Portal," Phoenix Controls, Inc., 2013.
Quirk, "A Brief History of BIM," Arch Daily, Dec. 7, 2012.
Samad et al., "Leveraging the Web: A Universal Framework for Building Automation," Proceedings of the 2007 American Control Conference, Jul. 11, 2007.
Sinha et al., "9 Key attributes of energy dashboards and analytics tools," Aug. 28, 2013, https://www.greenbiz.com/blog/2013/08/28/9-key-attributes-energy-dashboards-and=analytics-tools.
Sinopoli, "Dashboards For Buildings," http://www/automatedbuildings.com/news/dec10/articles/sinopoli/101119034404sinopoli.html, Dec. 2010.
Sinopoli, "Modeling Building Automation and Control Systems," http://www.automatedbuildings.com/news/jun13/articles/sinopoli/130521122303sinopoli.html, Jun. 2013.

Zito, "What is Tridium Part 1," http://blog.buildingautomationmonthly.com/what-is-tridium/, May 12, 2013.
Zito, "What is Tridium Part 2," http://blog.buildingautomationmonthly.com/tridium-part-2/, Sep. 10, 2013.
International Search Report and Written Opinion dated Jul. 17, 2018 for International PCT Application No. PCT/US2018/025189 (12 pages).
"Data analytics and smart buildings increase comfort and energy efficiency", https://www.microsoft.com/itshowcase/Article/Content/845/Data-analytics-and-smart-buildings-increase-comfort-and-energy-efficiency, Dec. 19, 2016, 8 pages.
Donnelly, "Building Energy Management: Using Data as a Tool", http://www.buildingefficiencyinitiative.org/sites/default/files/legacy/InstituteBE/media/Library/Resources/Existing-Building-Retrofits/Using-Building-Data-as-a-Tool.pdf, Oct. 2012, 9 pages.
"ASHRAE Dashboard Research Project," 29 pages, Aug. 28, 2008.
Honeywell, "Energy Manager User Guide," Release 3.2, 180 pages, 2008.
"Fuzzy Logic Toolbox 2.1, Design and Stimulate Fuzzy Logic Systems," The MathWorks, 2 pages, May 2004.
"Junk Charts, Recycling Chartjunk as junk art," 3 pages, Oct. 2, 2006.
"Model Predictive Control Toolbox 2, Develop Internal Model-Based Controllers for Constrained Multivariable Processes," The MathWorks, 4 pages, Mar. 2005.
Honeywell, "Product Guide 2004," XP-002472407, 127 pages, 2004.
"Statistics Toolbox, for Use with Matlab," User's Guide Version2, The MathWorks, 408 pages, Jan. 1999.
"Vykon Energy Suite Student Guide," Tridium Inc., 307 pages, Mar. 3, 2006.
"Web Based Energy Information Systems for Energy Management and Demand Response in Commercial Buildings," California Energy Commission, 80 pages, Oct. 2003.
Andover Controls, Network News, vol. 2, No. 2, 8 pages, 1997.
Andover Controls World, 4 pages, Spring 1997.
Bell et al., "Early Event Detection-Results from A Prototype Implementation," AICHE Spring National Meeting, 15 pages, Apr. 2005.
Cadgraphics, "The Cadgraphics User's Guide," 198 pages, 2003.
Carrier Comfort Network CCN Web, "Web Browser User Interface to the Carrier Comfort Network," 2 pages, 2002.
Carrier Comfort Network CCN Web, Overview and Configuration Manual, 134 pages, Apr. 2006.
Carrier Comfort Network CCN Web, Product Data, 2 pages, Apr. 2006.
Carrier, "i-Vu Powerful and Intuitive Front End for Building Control," 2 pages, Aug. 2005.
Carrier, "i-Vu Web-Based Integrated Control System," 3 pages, 2005.
Carrier, Demo Screen Shots, 15 pages, prior to Aug. 27, 2007.
Carrier, i-Vu CCN 4.0, Owner's Guide, 20 pages, Jul. 2007.
Carrier, i-Vu CCN, 7 pages, 2007.
Chan, "Rank Revealing QR Factorizations," Linear Algebra and It's Applications, vol. 88-89, p. 67-82, Apr. 1987.
Circon, "i-Browse Web-Based Monitoring and Control for Facility Management," 2 pages, prior to Aug. 27, 2007.
Australian Application 2009904740, Published copy, 28 pages, Application Filed on Sep. 29, 2009.
Echelon, "Energy Control Solutions with the i.Lon SmartServer," 4 pages, 2007.
Echelon, "i.Lon 100e3 Internet Server Models 72101R-300, 72101R-308, 72102R-300, 72103-R300 . . . " 5 pages, copyright 2002-2007.
Echelon, "i.Lon 100e3 Internet Server New Features," 15 pages, Sep. 2006.
Echelon, "i.Lon SmartServer," 5 pages, 2007.
Honeywell News Release, "Honeywell's New Sysnet Facilities Integration System for Boiler Plant and Combustion Safety Processes," 4 pages, Dec. 15, 1995.
Honeywell, "Excel Building Supervisor-Integrated R7044 and FS90 Ver. 2.0," Operator Manual, 70 pages, Apr. 1995.
Honeywell Home and Building Control Bulletin, "Introduction of the S7350A Honeywell WebPAD Information Appliance," 2 pages,

(56) References Cited

OTHER PUBLICATIONS

Aug. 29, 2000; Picture of WebPad Device with touch screen, 1 Page; and screen shots of WebPad Device, 4 pages.
Honeywell, Excel 15B W7760B Building Manager Release 2.02.00, Installation Instructions, 28 pages, Dec. 2004.
Honeywell, The RapidZone Solution, Excel 5000 Open System, Application Guide, 52 pages, Jan. 2004.
"Remote Building Monitoring and Operations Home Page," 5 pages, prior to Aug. 27, 2007.
"Carrier: i-Vu CCN," 1 page, printed Mar. 11, 2008.
Carrier: 33CSCCNWEB-01 CCN Web Internet Connection to the Carrier Comfort Network, 1 page, printed Mar. 11, 2008.
"Products," 5 pages, printed Jul. 3, 2007. http://www.docs.hvacpartners.com/idc/groups/public/documents/techlit/gs-controls-ivuccn.rtf.
Lightstat Incorporated, "Internet Programmable Communicating Thermostats," 1 page, printed Mar. 13, 2007. http://www.lightstat.com/products/istat.asp.
Sharp, "Actius RD3D Desktop Replacement Notebook with Industry-Breakthrough 3D Screen," 1 page, printed Jun. 16, 2005. http://www.sharpsystems.com/products/pc_notebooks/actius/rd/3d/.
"Lights On A Wireless Lighting Control System," 11 pages, printed Mar. 22, 2007 http://www2.sims.berkeley.edu/courses/is213/s06/projects/lightson;final.html.
I.Lon 100e3 Internet Server, 1 page, prior to Aug. 27, 2007.
I.Lon, SmartServer, 2 pages, prior to Aug. 27, 2007.
I-stat, Demo Screen Shots, 9 pages, printed Mar. 13, 2007.
I-stat, The Internet Programmable Thermostat, 2 pages, prior to Aug. 27, 2007.
Ball, "Green Goal of 'Carbon Neutrality' Hits Limit," TheWall Street Journal, 7 pages, Dec. 30, 2008.
Network Integration Engine (NIE), Johnson Controls, 3 pages, Nov. 9, 2007.
Network Integration Engine (NIE), Product Bulletin, Johnson Controls, pp. 1-11, Jan. 30, 2008.
Kourti, "Process Analysis and Abnormal Situation Detection: From Theory to Practice," IEEE Control Systems Magazine, p. 10-25, Oct. 2002.
Mathew, "Action-Oriented Benchmarking, Using CEUS Date to Identify and Prioritize Efficiency Opportunities in California Commercial Buildings," 26 pages, Jun. 2007.
Morrison et al., "The Early Event Detection Toolkit," Honeywell Process Solutions, 14 pages, Jan. 2006.
Narang, "Webarc: Control and Monitoring of Building Systems Over the Web," 53 pages, May 1999.
Sinha et al; "Balance Infection Risk, Sustainability and Comfort with Open Blue," Johnson Controls, 2 pages, 2021.
Building Automation System in Michigan, Johnson Heating and Cooling, L.L.C., www.cooljohnson.com/Building-Automation-Systems-Michigan/Macomb-County-Michigan/Building-Automation-Confidential-Customer.html, 4 pages, Accessed Nov. 21, 2022.
Building Automation System Waterford Michigan 48328 JLA, Johnson Heating and Cooling L.L.C., www.cooljohnson.com/Building-Automation-Systems-Michigan/Waterford-Michigan/Building-Automation-System-JLA.html, 3 pages, Accessed Nov. 21, 2022.
Building Automation Systems Waterford Michigan 48330 SJMO, Johnson Heating and Cooling, L.L.C., www.cooljohnson.com/Building-Automation-Systems-Michigan/Waterford-Michigan/Building-Automation-Systems-SJMO.html, 2 pages, Accessed Nov. 21, 2022.
Building Automation Systems Waterford Michigan 48329 WIM, Johnson Heating and Cooling L.L.C., www.cooljohnson.com/Building-Automation-Systems-Michigan/Building-Automation-Systems-WIM.html, 3 pages, accessed Nov. 21, 2022.
Building Automation Clawson Michigan 2.0, Johnson Heating and Cooling L.L.C., www.cooljohnson.com/Building-Automation-Systems-Michigan/Clawson-Michigan/Building-Automation-Clawson-Manor-2.html, 6 pages, Accessed Nov. 21, 2022.
Building Automation in Detroit—Mosaic Christian, Johnson Heating and Cooling L.L.C., www.cooljohnson.com/Building-Automation-Systems-Michigan/Detroit/Mosaic-Christian.html, 5 pages, Accessed Nov. 21, 2022.
Building Automation in Michigan—Divine Grace, Johnson Heating and Cooling L.L.C., www.cooljohnson.com/Building-Automation-Systems-Michigan/Oakland-County-Michigan/Building-Automation-Divine-Grace.html, 3 pages, Accessed Nov. 21, 2022.
Building Automation System Plymouth, Michigan, Johnson Heating and Cooling L.L.C., www.cooljohnson.com/Building-Automation-Systems-Michigan/Plymouth-Michigan/Building-Automation-System-Plymouth-Michigan.html, 8 pages, Accessed Nov. 21, 2022.
Building Automation Systems Shelby Michigan 48316 SG, Johnson Heating and Cooling L.L.C., www.cooljohnson.com/Building-Automation-Systems-Michigan/Shelby-Township-Michigan/Building-Automation-Systems-SG.html, 3 pages, Accessed Nov. 21, 2022.
Building Automation System St. Clair County, Michigan, Johnson Heating and Cooling L.L.C., www.cooljohnson.com/building-Automation-Systems-Michigan/St-Clair-Michigan/Building-Automation-system-St-Clair-Michigan.html, 4 pages, Accessed Nov. 21, 2022.
Building Automation System Troy Michigan Oakland Mall, Johnson Heating and Cooling L.L.C., www.cooljohnson.com/Building-Automation-Systems-Michigan/Troy Michigan/Building-Automation-System-Oakland-Mall.html, 4 pages, Accessed Nov. 21, 2022.
Building Automation System Waterford Michigan 48327 Excel, Johnson Heating and Cooling L.L.C., www.cooljohnson.com/Building-Automation-Systems-Michigan/Waterford-Michigan/Building-Automation-System-excel.html, 2 pages, Accessed Nov. 22, 2022.
Building Automation System Romeo Michigan 48065 RomeoPR, Johnson Heating and Cooling, L.L.C., www.cooljohnson.com/Building-Automation-Systems-Michigan/Romeo-Michigan/Building-Automation-System-RomeoPR.html, 2 pages, Accessed Nov. 21, 2022.
Johnson, Jr., "Cooling Logic™: Changing the Way You Cool," Johnson Solid State, LLC, 12 pages, Nov. 7, 2018.
Building Automation System Clawson Michigan Clawson Manor, Johnson Heating and Cooling L.L.C., www.cooljohnson.com/building-Automation-Systems-michigan/clawson-Michigan/building-Automation-System-Clawson-Manor.html, 3 pages, Accessed Nov. 21, 2022.
Johnson, Jr., "CoolingLogic™ A Method to increase HVAC System Efficiency And Decrease Energy Consumption," A White Paper, Johnson Solid State, L.L.C., 51 pages, Sep. 24, 2016.
Johnson, Jr., "CoolingLogic™: Mosaic Christian Church A Case Study," 140 pages, Feb. 2, 2019.

\* cited by examiner

Honeywell | LDS Church | Overview

| | | | | | | Welcome, |
|---|---|---|---|---|---|---|
| 11 Sites | 1 Offline Sites | 7 Active High Alarm Sites | 5 Excess Energy Use Sites | 3 Manual Override Sites | | Date from 04/28/2020 |

| Sites | Alarm Total ◊ | Active High Alarm ◊ | Comfort Score % ◊ | Temp Score % ◊ | Humidity Score % ◊ | CO2 Score % ◊ | Excess Use ◊ | Factory Default Schedule ◊ | Manual Override ◊ | Override Duration (h) |
|---|---|---|---|---|---|---|---|---|---|---|
| ∧ LDS 7350 High River | 34 | 7 | 98.3 | 98.3 | 98.3 | 98.3 | Yes | Yes | Yes | 69 (18 times) |
| Chapel | 17 | 3 | 99.3 | 99.3 | 99.3 | 99.3 | Yes | Yes | Yes | 20 (7 times) |
| F3 RS RM Bishop | 0 | 0 | 97.3 | 97.3 | 97.3 | 97.3 | No | No | No | 0 |
| F4 Cultural Hall | 3 | 0 | 97.3 | 97.3 | 97.3 | 97.3 | Yes | Yes | Yes | 10 (1 time) |
| NW Library Side | 10 | 0 | 99.3 | 99.3 | 99.3 | 99.3 | Yes | Yes | Yes | 15 (5 times) |
| North Wing | 4 | 4 | 92.1 | 92.1 | 92.1 | 92.1 | Yes | No | Yes | 24 (5 times) |
| West Class RM | 0 | 0 | 87.4 | 87.4 | 87.4 | 87.4 | No | Yes | No | 0 |
| ∨ LDS 7350 Mento | 0 | 0 | 99 | 77 | 77 | 77 | No | No | No | 0 |
| ∨ LDS 7350 Power | 123 | 23 | 65 | 93 | 93 | 93 | Yes | Yes | Yes | 0 |
| ∨ LDS Bountiful 11, 21... | 43 | 10 | 78 | 78 | 78 | 78 | No | No | No | 0 |
| ∨ LDS Cherry Grove | 53 | 5 | 92 | 92 | 92 | 92 | No | No | No | 0 |
| ∨ LDS Clarksville TN L... | 67 | 7 | 77 | 77 | 77 | 77 | No | No | No | 0 |
| ∨ LDS Cochrane | 876 | 4 | 93 | 93 | 93 | 93 | No | No | No | 0 |
| ∨ LDS Fernandina | 143 | 43 | 78 | 78 | 78 | 78 | Yes | Yes | Yes | 34 (4 times) |

DASHBOARD FOR MULTI SITE MANAGEMENT SYSTEM

This is a continuation of co-pending U.S. patent application Ser. No. 17/345,955, filed Jun. 11, 2021, and entitled "DASHBOARD FOR MULTI SITE MANAGEMENT SYSTEM", which claims the benefit of U.S. Provisional Application No. 63/039,373, filed Jun. 15, 2020, both of which are hereby incorporated by reference.

TECHNICAL FIELD

The present disclosure relates generally to building management systems, and more particularly to multi-site building management systems.

BACKGROUND

Portfolio managers may be responsible for monitoring tens, hundreds or even thousands of different building locations that may be spread out across different states or even across different nations. Each of the building locations may have a local building management system that provides data on alarms, energy conservation and the like. It can be difficult to easily spot potential problems occurring at a single building location, much less from a multitude of building management systems that are spread out geographically. It will be appreciated that the sheer volume of data, even if limited for example to active alarms, can be overwhelming. What would be desirable would be a multi-site management system that can help a portfolio manager manage the data coming in from a number of different building management systems.

SUMMARY

The present disclosure relates generally to helping a portfolio manager manage the sheer volume of data coming in from a number of different building management systems and assist the portfolio manager in quickly and efficiently detecting and responding to potential issues throughout the portfolio of buildings for which they are responsible. In an example, a multi-site Building Management System (BMS) monitors performance of a local BMS at each of a plurality of remote sites. This example multi-site BMS includes a port, a display and a controller that is operatively coupled to the display and the port. The port receives operational data from the local BMS of each of the plurality of remote sites. The controller is configured to determine a plurality of local performance metrics associated with the local BMS of each of the plurality of remote sites based on the operational data received from the local BMS of each of the plurality of remote sites. The controller is further configured to aggregate like ones of the plurality of local performance metrics from the plurality of remote sites, resulting in a plurality of aggregated performance metrics. The controller is further configured to display on the display a plurality of panels, each panel associated with a different one of the plurality of local performance metrics. The controller also displays in each of the plurality of panels the corresponding one of the plurality of aggregated performance metrics. The controller also displays in each of the plurality of panels a ranking of one or more of the remote sites by their corresponding local performance metric, sometimes with outliers ranked first so they are easily identified and accessed.

In another example, a non-transient computer readable medium has instructions stored thereon. When the instructions are executed by a processor, the processor is caused to determine a plurality of local performance metrics associated with a local BMS of each of a plurality of remote sites based on operational data received from the local BMS of each of the plurality of remote sites. The processor is further caused to aggregate like ones of the plurality of local performance metrics from the plurality of remote sites, resulting in a plurality of aggregated performance metrics. The processor is further caused to display on the display a plurality of panels, each panel associated with a different one of the plurality of local performance metrics. The processor is further caused to display in each of the plurality of panels the corresponding one of the plurality of aggregated performance metrics. The processor is also caused to allow a user to select one of the plurality of remote sites, and in response to selection of one of the plurality of remote sites, display a site view that includes at least some of the local performance metrics associated with the particular selected remote site.

In another example, a method monitors a performance of a local BMS at each of a plurality of remote sites. A plurality of local performance metrics associated with a local BMS of each of a plurality of remote sites are determined based on operational data received from the local BMS of each of the plurality of remote sites. Like ones of the plurality of local performance metrics from the plurality of remote sites are aggregated, resulting in a plurality of aggregated performance metrics. A plurality of panels are displayed on a display, each panel associated with a different one of the plurality of local performance metrics. The corresponding one of the plurality of aggregated performance metrics are displayed in each of the plurality of panels. A ranking of one or more of the remote sites by their corresponding local performance metric is also displayed in each of the plurality of panels.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIGS. 6 through 11 are illustrative dashboard screens that may be generated by the illustrative multi-site BMS of FIG. 2.

Figure 1:
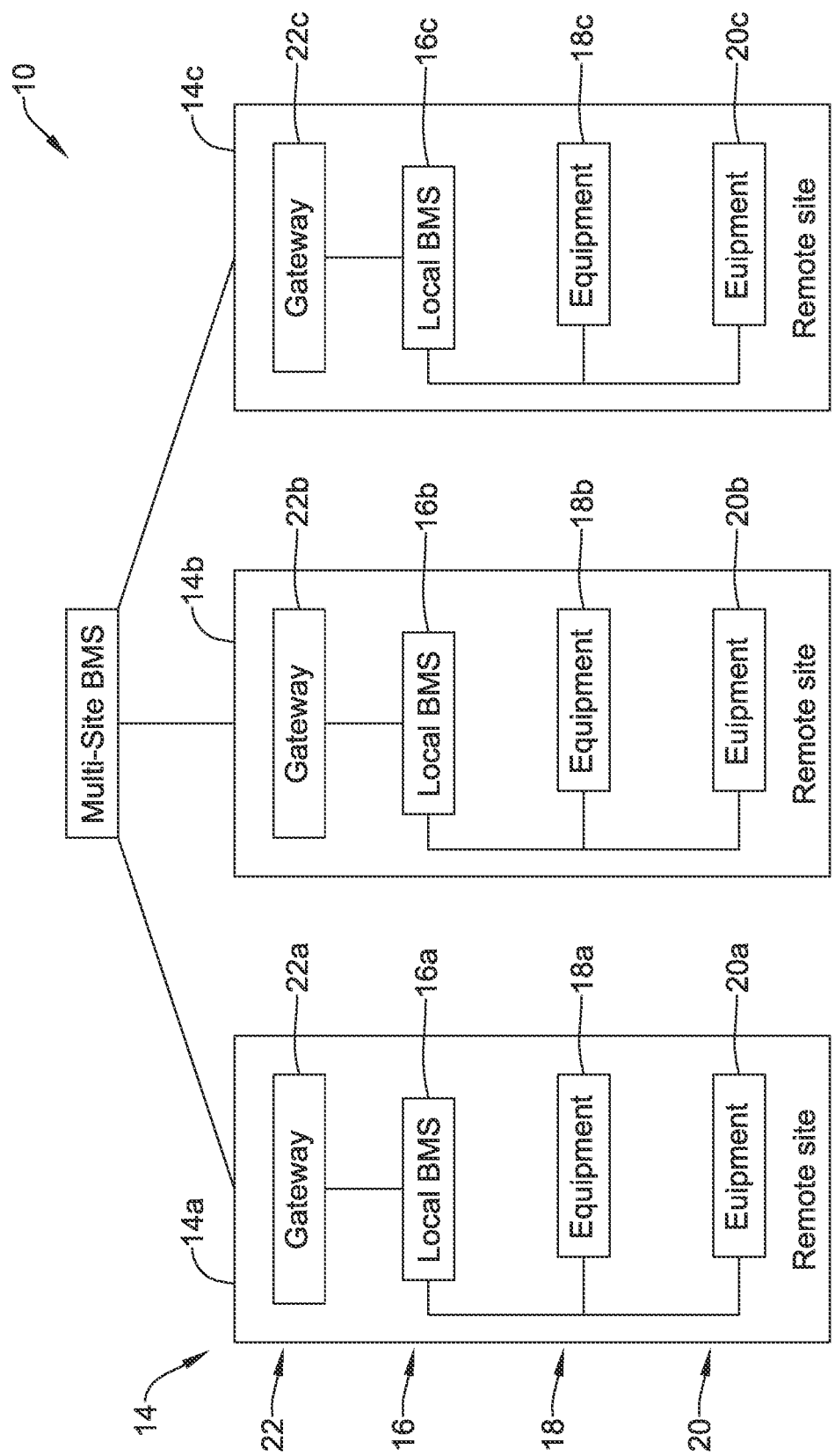
FIG. 1 is a schematic block diagram of an illustrative multi-site BMS operatively coupled to a number of remote sites.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative building management system 10. In its broadest terms, the illustrative building management system 10 includes a multi-site BMS 12 and a plurality of remote sites 14 operatively coupled to the multi-site BMS. While a total of three remote sites 14 are shown, it will be appreciated that this is merely illustrative, as the multi-site BMS 12 may oversee and/or monitor operations of a large number of remote sites 14. The remote sites 14 may be distributed across a large geographic area. Each of the remote sites 14 are individually labeled as 14a, 14b, 14c and may each represent any of a variety of different types of sites. While each of the remote sites 14 may be described herein as being buildings, this is not required in all cases. For example, some of the remote sites 14 may also represent factories or other processing facilities.

In the example shown, each of the remote sites 14 include a local BMS 16, individually labeled as 16a, 16b, 16c. In some cases, some of the remote sites 14 may not include a local BMS 16. In such cases, the equipment 18, 20 and/or controllers (not illustrated) that control operation of the equipment 18, 20 may communicate directly with the gateway 22. In some cases, information pertaining to operation of the equipment 18, 20 may be accessible by logging into a local system (not illustrated), or even into the local controllers, with a local dashboard displayed on a web browser or a smart device such is a tablet or smart phone.

Each local BMS 16 may be considered as being operably coupled with a variety of different equipment 18, 20 that is located at the remote site 14. It will be appreciated that there will typically be many more pieces of equipment 18, 20 than the two that are illustrated at each remote site 14. The equipment 18, 20 is individually labeled as 18a, 20a, 18b, 20b, 18c, 20c, and may include Heating, Ventilating and Air Conditioning (HVAC) system components. The equipment 18, 20 may include lighting system components, security system components, and the like. Each BMS 16 may be configured to receive operational data from the equipment 18, 20 and to formulate control commands for the equipment 18, 20 in response to the received operational data. Each local BMS 16 may be configured to enable local control of the equipment 18, 20, as well as local monitoring of the equipment 18, 20.

In some cases, the local BMS 16 may be configured to provide operational data to the multi-site BMS 12. In order to communicate with the multi-site BMS 12, in some cases each of the remote sites 14 may include a gateway 22, individually labeled as 22a, 22b, 22c. The gateways 22, if present, may provide a way by which each local BMS 16 can communicate with the multi-site BMS 12. The gateways 22 may provide a means for operational data to be uploaded from each local BMS 16 to the multi-site BMS 12 as well as control commands to be downloaded from the multi-site BMS 12 to each local BMS 16. In some cases, the gateways 22 may be configured to download software packages from the multi-site BMS 12 that better configures each local BMS 16 for communication with the multi-site BMS 12.

Figure 2:
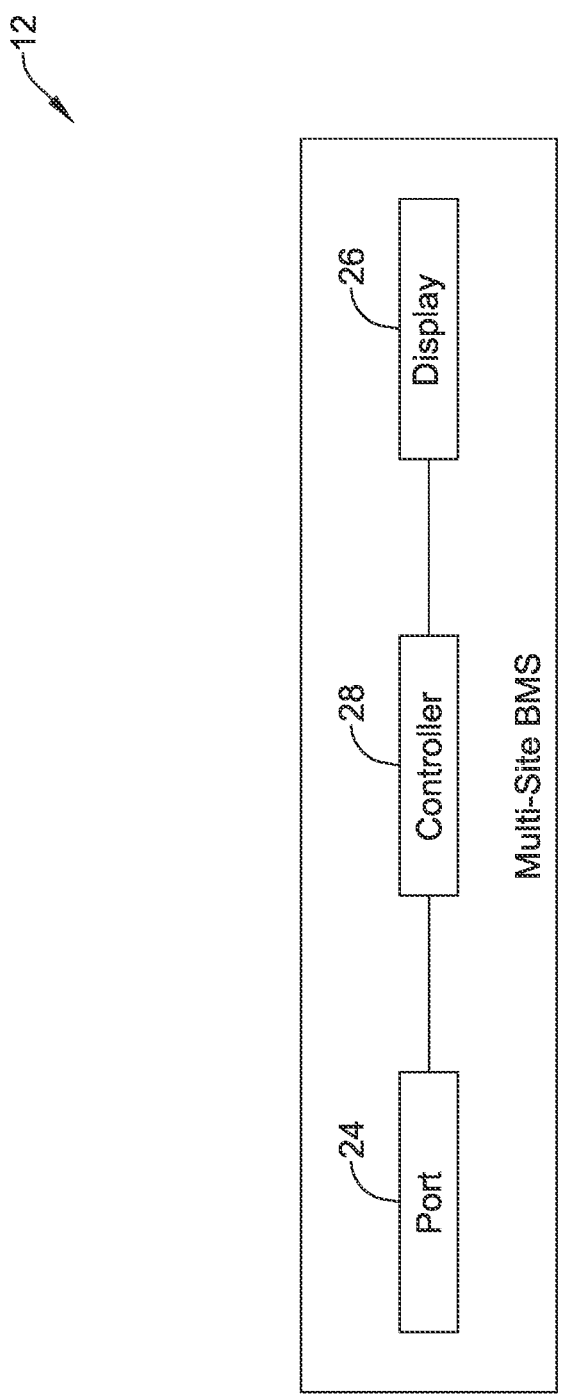
FIG. 2 is a schematic block diagram of an illustrative multi-site BMS usable in the illustrative building system of FIG. 1.

FIG. 2 is a schematic block diagram of the illustrative multi-site BMS 12. The multi-site BMS 12 may be considered as being configured to monitor the performance of the local BMS 16 at each of the remote sites 14. The multi-site BMS 12 includes a port 24 that is configured to receive operational data from the local BMS 16 at each of the remote sites 14. The multi-site BMS includes a display 26 and a controller 28 that is operatively coupled to the port 24 and to the display 26. The controller 28 may be configured to determine a plurality of local performance metrics associated with the local BMS 16 of each of the plurality of remote sites 14 based on the operational data received from the local BMS 16 of each of the plurality of remote sites 14. One of the local performance metrics may be associated with alarms that are issued by the local BMS 16. Another of the local performance metrics may be associated with comfort provided by the local BMS 16. Another of the local performance metrics may be associated with energy usage by the local BMS 16. These are just examples.

The controller 28 may be configured to aggregate like ones of the plurality of local performance metrics from the plurality of remote sites 14, resulting in a plurality of aggregated performance metrics. For example, the local performance metrics associated with alarms from each of the remote sites may be rolled up or aggregated into one or more aggregated performance metrics associated with alarms. Aggregating may, for example, include one or more of averaging like ones of the plurality of local performance metrics from the plurality of remote sites 14 or summing like ones of the plurality of local performance metrics from the plurality of remote sites 14. Alternatively, or in addition, aggregating may include computing a score based on like ones of the plurality of local performance metrics from the plurality of remote sites 14 and/or ranking like ones of the plurality of local performance metrics from the plurality of remote sites 14. These are just examples.

The controller 28 may display on the display 26 a plurality of panels, each panel associated with a different one of the plurality of local performance metrics. The controller 28 may also display in each panel the corresponding one of the plurality of aggregated performance metrics. In some cases, the controller 28 may display in each of the plurality of panels a ranking of one or more of the remote sites 14 by their corresponding local performance metric.

In some cases, a first one of the plurality of panels that are displayed on the display 26 may be associated with a first local performance metric that is associated with alarms that are issued by the local BMS 16. A second one of the plurality of panels that are displayed on the display 26 may be associated with a second local performance metric that is associated with comfort provided by the local BMS 16. A third one of the plurality of panels that are displayed on the display 26 may be associated with a third local performance metric that is associated with energy usage by the local BMS 16. These are just examples.

In some instances, the controller 28 may be configured to process each of the plurality of local performance metrics of each of the plurality of remote sites 14 to identify those that do not meet a predefined criteria. The controller 28 may be configured to classify each of the plurality of local performance metrics of each of the plurality of remote sites 14 that do not meet the predefined criteria as needing attention. In some cases, the controller 28 may be configured to aggregate like ones of the plurality of local performance metrics from the plurality of remote sites 14 that are classified as needing attention, and display an indication of the aggregation of those needing attention on the corresponding one of the plurality of panels.

In some cases, the controller 28 may be configured to display a map view adjacent the plurality of panels, wherein the map view displays a geographical location of at least some of the plurality of remote sites 14. The controller 28 may allow a user to select a sub-set of the plurality of remote sites 14 on the map view, and in response, aggregate like ones of the plurality of local performance metrics from only the sub-set of the plurality of remote sites 14, and display in each of the plurality of panels the corresponding one of the plurality of aggregated performance metrics for only the sub-set of the plurality of remote sites.

The controller 28 may be configured to allow a user to select one of the plurality of remote sites 14 and, in response to selection of one of the plurality of remote sites 14, display a site view that includes at least some of the local performance metrics associated with the particular selected remote site 14. In some cases, the controller 28 is also configured to, in response to selection of one of the plurality of remote sites 14, display performance indicators associated with one or more pieces of equipment 18, 20 that are part of the local BMS 16 at the selected remote site and to allow a user to select one of the pieces of equipment 18, 20 that are part of the local BMS 16 at the selected remote site 14. In response to selection of one of the pieces of equipment 18, 20 that are part of the local BMS 16 at the selected remote site 14, the controller 28 is configured to display an equipment view that includes additional information associated with the operation of the to select one of the pieces of equipment 18, 20. In some cases, the additional information associated with the operation of the selected one of the pieces of equipment may include one or more alarms issued by the selected one of the pieces of equipment 18, 20, sensor values associated with the operation of the select one of the pieces of equipment 18, 20, control signals associated with the operation of the select one of the pieces of equipment 18, 20, and/or a schedule associated with the select one of the pieces of equipment 18, 20.

Figure 3:
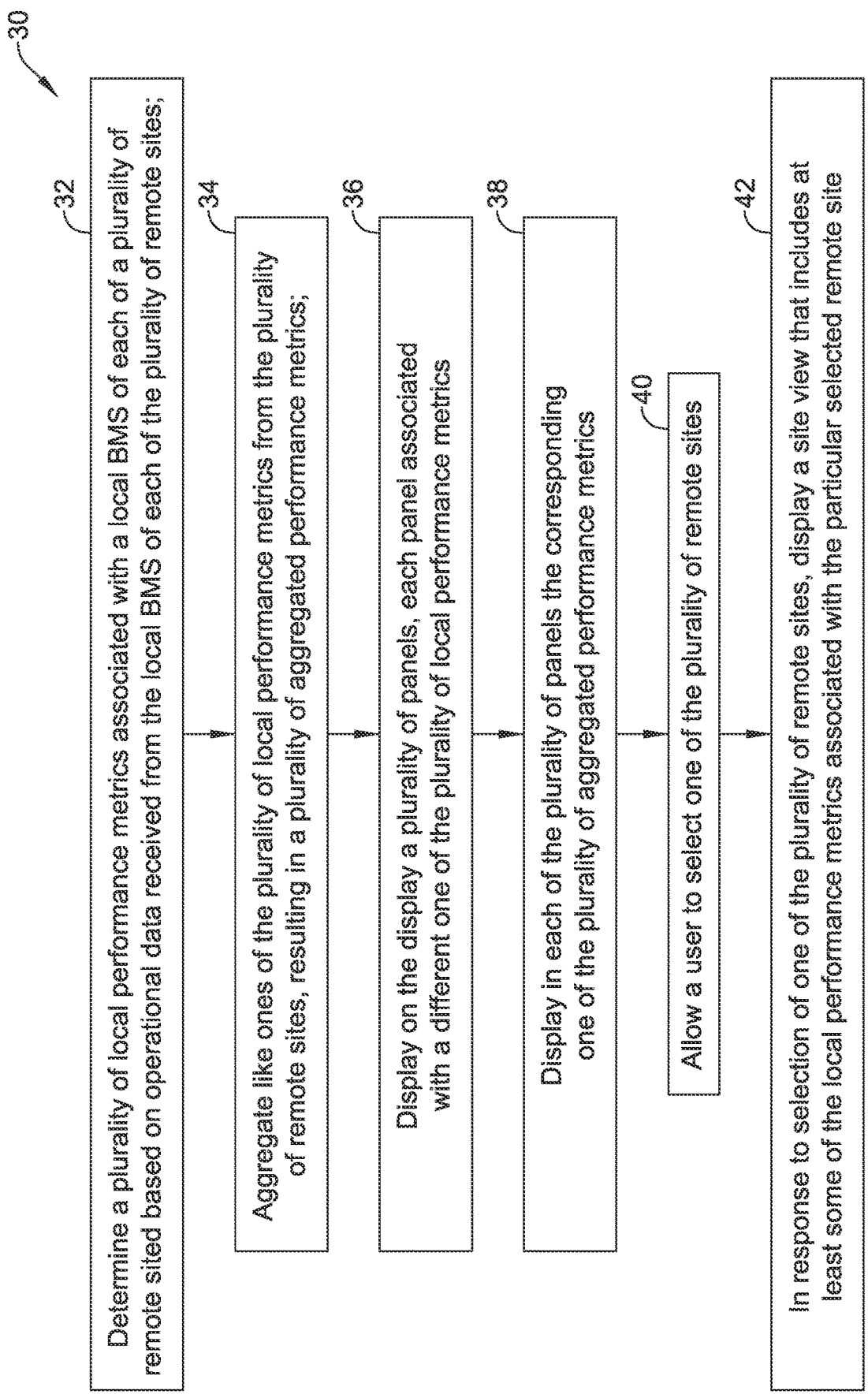
FIG. 3 is a flow diagram showing an illustrative method using the illustrative multi-site BMS of FIG. 2.

FIG. 3 is a flow diagram showing an illustrative method 30 that may be carried out by the multi-site BMS 12. A plurality of local performance metrics associated with a local BMS of each of a plurality of remote sites 14 is determined based on operational data received from the local BMS 16 of each of the plurality of remote sites 14, as indicated at block 32. Like ones of the plurality of local performance metrics from the plurality of remote sites 14 are aggregated, resulting in a plurality of aggregated performance metrics, as indicated at block 34. A plurality of panels are displayed on the display 26, each panel being associated with a different one of the plurality of local performance metrics, as indicated at block 36. The corresponding one of the plurality of aggregated performance metrics are displayed in each of the plurality of panels, as indicated at block 38.

As an example, a first one of the plurality of panels may be associated with a first local performance metric such as alarms that are issued by the local BMS 16. A second one of the plurality of panels may be associated with a second local performance metric such as comfort provided by the local BMS 16. A third one of the plurality of panels may be associated with a third local performance metric such as energy usage by the local BMS 16. A user is allowed to select one of the plurality of remote sites 14, as indicated at block 40. In response to selection of one of the plurality of remote sites 14, a site view is displayed that includes at least some of the local performance metrics associated with the particular selected remote site 14, as indicated at block 42.

Figure 4:
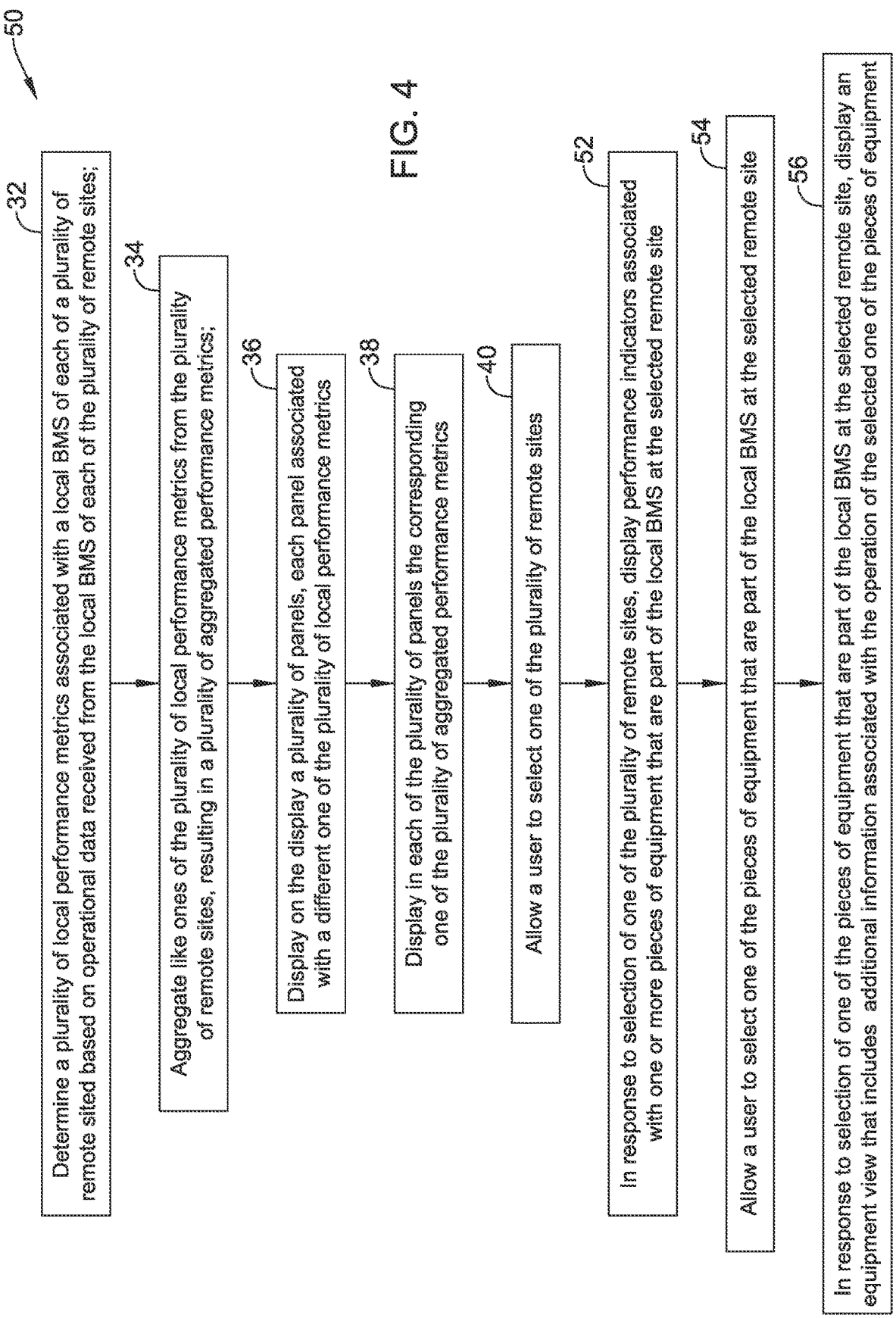
FIG. 4 is a flow diagram showing an illustrative method using the illustrative multi-site BMS of FIG. 2.

FIG. 4 is a flow diagram showing an illustrative method 50 that may be carried out by the multi-site BMS 12. A plurality of local performance metrics associated with a local BMS of each of a plurality of remote sites 14 is determined based on operational data received from the local BMS 16 of each of the plurality of remote sites 14, as indicated at block 32. Like ones of the plurality of local performance metrics from the plurality of remote sites 14 are aggregated, resulting in a plurality of aggregated performance metrics, as indicated at block 34. A plurality of panels are displayed on the display 26, each panel being associated with a different one of the plurality of local performance metrics, as indicated at block 36. The corresponding one of the plurality of aggregated performance metrics are displayed in each of the plurality of panels, as indicated at block 38. A user is allowed to select one of the plurality of remote sites 14, as indicated at block 40.

In response to selection of one of the plurality of remote sites 14, performance indicators associated with one or more pieces of equipment 18, 20 that are part of the local BMS 16 at the selected remote site 14 are displayed, as indicated at block 52. A user is allowed to select one of the pieces of equipment 18, 20 that are part of the local BMS 16 at the selected remote site 14, as indicated at block 54. In response to selection of one of the pieces of equipment 18, 20 that are part of the local BMS 16 at the selected remote site 14, an equipment view is displayed that includes additional information associated with the operation of the selected one of the pieces of equipment 18, 20, as indicated at block 56. In some cases, the additional information associated with the operation of the selected one of the pieces of equipment 18, 20 may include one or more of alarms issued by the selected one of the pieces of equipment 18, 20, sensor values associated with the operation of the select one of the pieces of equipment 18, 20, control signals associated with the operation of the select one of the pieces of equipment 18, 20 and a schedule associated with the select one of the pieces of equipment 18, 20.

Figure 5:
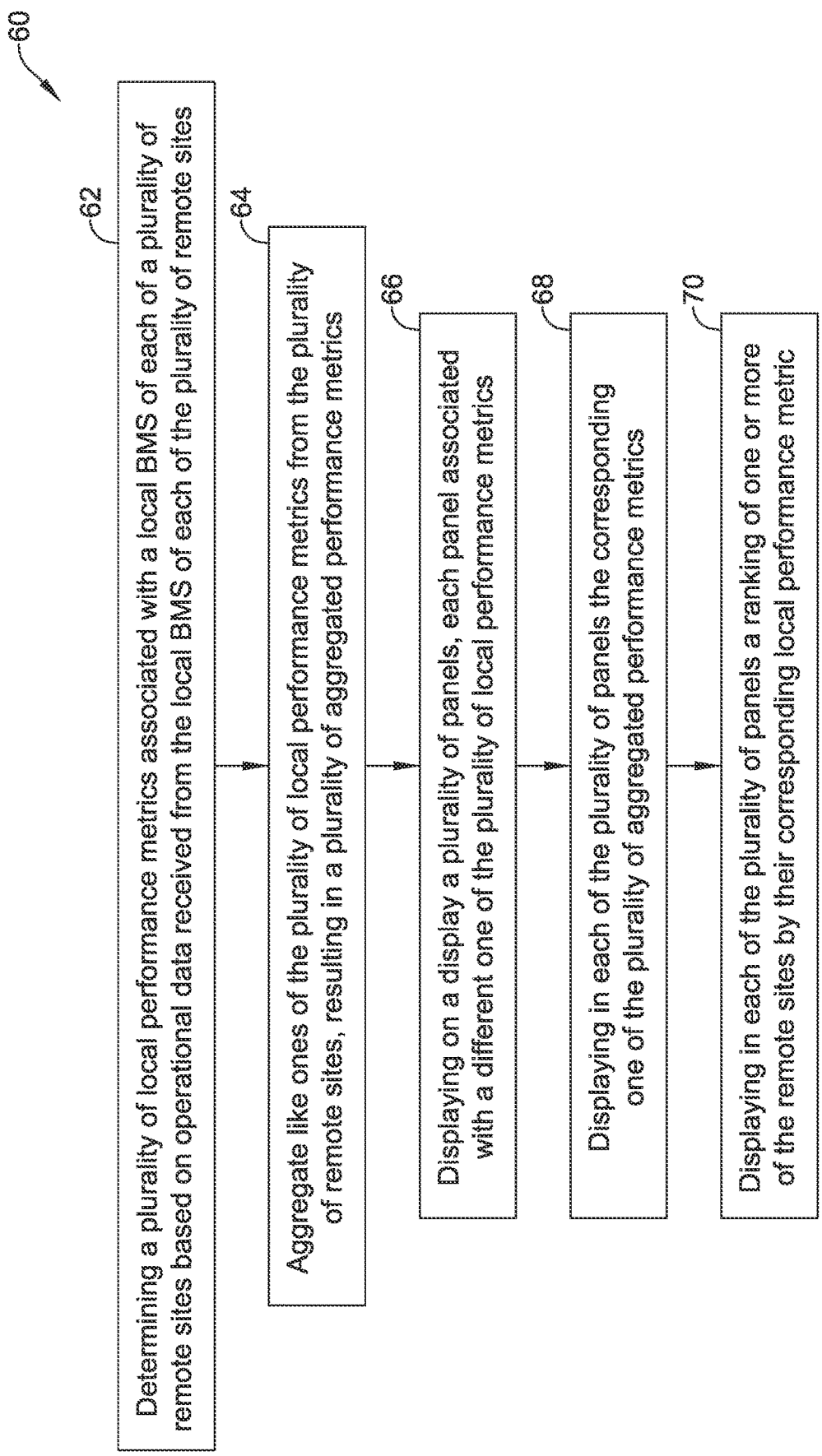
FIG. 5 is a flow diagram showing an illustrative method using the illustrative multi-site BMS of FIG. 2.

FIG. 5 is a flow diagram showing an illustrative method 60 for monitoring a performance of a local BMS 16 at each of a plurality of remote sites 14. A plurality of local performance metrics associated with a local BMS 16 of each of a plurality of remote sites 14 are determined based on operational data received from the local BMS 16 of each of the plurality of remote sites 14, as indicated at block 62. Like ones of the plurality of local performance metrics from the plurality of remote sites 14 are aggregated, resulting in a plurality of aggregated performance metrics, as indicated at block 64. In some cases, aggregating includes one or more of averaging like ones of the plurality of local performance metrics from the plurality of remote sites 14 or summing like ones of the plurality of local performance metrics from the plurality of remote sites 14. Aggregating may also include one or more of computing a score based on like ones of the plurality of local performance metrics from the plurality of remote sites 14 and ranking like ones of the plurality of local performance metrics from the plurality of remote sites 14.

A plurality of panels are displayed on the display 26, each panel associated with a different one of the plurality of local performance metrics, as indicated at block 66. The corresponding one of the plurality of aggregated performance metrics are displayed in each of the plurality of panels, as indicated at block 68. A ranking of one or more of the remote sites 14 by their corresponding local performance metric are displayed, at indicated at block 70.

Figure 6:
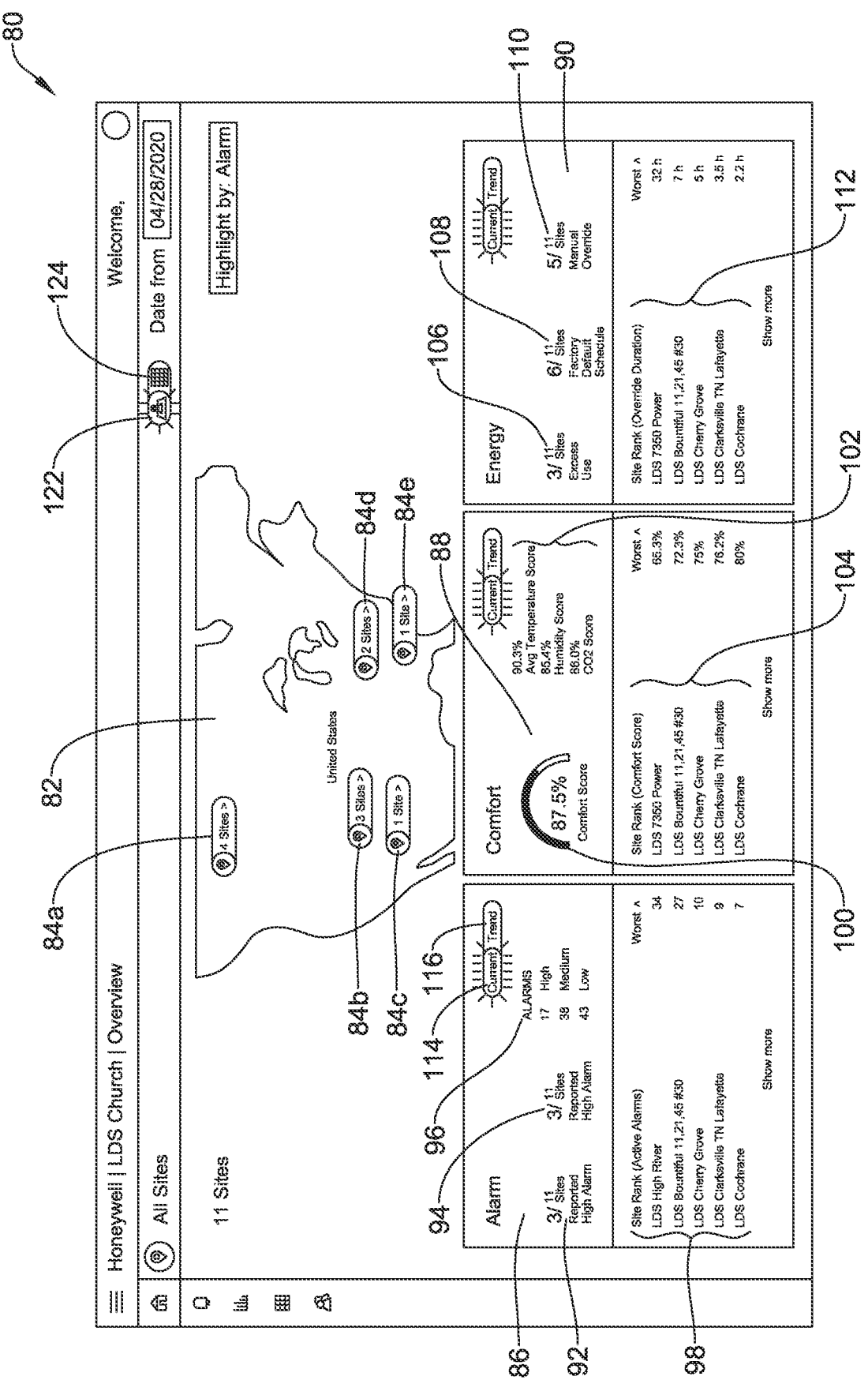

FIGS. 6 through 11 are screen shots showing examples of some of the screens that may be generated by the multi-site BMS 12. FIG. 6 shows a portfolio level dashboard 80. In some cases, as illustrated, the portfolio level dashboard 80 includes a map 82 that shows a geographic area in which a number of remote sites 14 are located. As shown, the map 82 includes several icons 84 that each represent one or more remote sites 14. For example, an icon 84a represents a total of four remote sites 14, an icon 84b represents a total of three remote sites 14, an icon 84c represents a single remote site 14, an icon 84d represents a total of two remote sites 14 and an icon 84e represents a single remote site 14. Each of the icons 84 may be selected in order to view additional information regarding the remote sites 14 that are represented by the particular icon 84.

In some cases, the icons 84 may be color coded. For example, a first color may represent alarms, a second color may represent comfort and a third color may represent energy. In some instances, different colors may be used to represent varying degrees of seriousness. For example, red may be used to indicate that there is a serious alarm at one of the remote sites 14 while yellow may be used to indicate a less serious alarm at one of the remote sites 14. Various colors may be used to indicate how many problems are detected at a particular remote site 14, for example.

The portfolio level dashboard 80 includes a number of panels. As illustrated, the portfolio level dashboard 80 includes an Alarm panel 86, a Comfort panel 88 and an Energy panel 90. In some instances, a user may determine that they are not interested in comfort, for example, and the controller 28 may be configured to no longer display the Comfort panel 88. This is just an example. The Alarm panel 86 may include a Reported Alarms icon 92 that shows how many alarms have been reported, an Active Alarms icon 94 that shows how many alarms are currently active and an Alarms Listing icon 96 that provides a listing of how many high alarms, how many medium alarms and how many low alarms are present. The Alarm panel 86 also includes a listing 98 of the site rankings of the remote sites 14 reporting alarms. The listing 98 may be sorted, if desired, to reveal superior performing sites and/or underperforming sites based on total number of alarms, number of unresolved alarms, number of serious alarms, frequency of alarms, average time taken to resolve an alarm, and or any other suitable criteria.

In the example shown, the Comfort panel 88 includes an overall Comfort Score icon 100 that provides a visual indication of an overall comfort score of the remote sites. The Comfort panel 88 also includes a listing 102 of the parameters being used to determine the overall comfort score. As shown, the overall comfort score is based at least in part upon an average temperature score, a humidity score and a carbon dioxide ($CO_2$) score. The Comfort panel 88 also includes a listing 104 of particular sites contributing to the overall comfort score. The listing 104 may be sorted, if desired, to reveal superior performing sites and/or underperforming sites. For example, each remote site may have a computed local comfort score based on the performance of the local BMS, and the listing 104 may be sorted by the local comfort score of each site. This is just one example.

In the example shown, the Energy panel 90 includes an Excess Use icon 106 that shows how many sites are reporting excessive energy usage, a Factory Default Schedule icon 108 that shows how many sites are using a factory default schedule and a Manual Override icon 110 that shows how many sites are operating under a manual override. The Energy panel 90 also includes a listing 112 that shows the sites contributing to the Excess Use icon 106, the Factory Default Schedule icon 108 and the Manual Override icon 110. The listing 112 may be sorted, if desired, to reveal superior performing sites and/or underperforming sites.

In the example shown, each of the Alarm panel 86, the Comfort panel 88 and the Energy panel 90 include a Current button 114 and Trend button 116. The Current button 114 may be selected to display current information (as is shown in FIG. 6). The Trend button 116 may be selected to display historical data including historical trends. In some cases, historical data may be shown in graphical form within the appropriate panel such as the Alarm panel 86, the Comfort panel 88 and the Energy panel 90.

In some cases, it is possible to toggle between the portfolio level dashboard 80 shown in FIG. 6 with a map view and a portfolio dashboard 120 with a list view. An example list view is shown in FIG. 7. The portfolio level dashboards 80, 120 include a map view icon 122 and a list view icon 124. It can be seen that in FIG. 6, the map view icon 122 has been selected while in FIG. 7, the list view icon 124 has been selected. The portfolio level dashboard 120 in list view includes a row 126 that provides information as to the number of sites, how many sites are offline, how many are currently in alarm, how many are currently using too much energy, and the like.

The portfolio level dashboard 120 in list view includes a Sites column 128, an Alarm total column 130, an Active High Alarm column 132, a Comfort Score column 134, a Temperature Score column 136, a Humidity Score column 138, a $CO_2$ Score column 140, an Excess Use column 142, a Factory Default Schedule column 144, a Manual Override column 146 and an Override Duration column 148. It will be appreciated that much of the information provided in the portfolio level dashboard 80 in map view is also shown in the portfolio level dashboard 120 in list view. A point of interest in the Site column 128 is that sites are organized in a hierarchal manner, with individual components listed under their corresponding header. For example, the header LDS 7350 High River has been expanded to reveal Chapel, F3 RS RM Bishop, and so on. In the example shown, Chapel, F3 RS RM Bishop are each individual pieces of equipment (e.g. a rooftop unit) at the LDS 7350 High River site.

Figure 8:
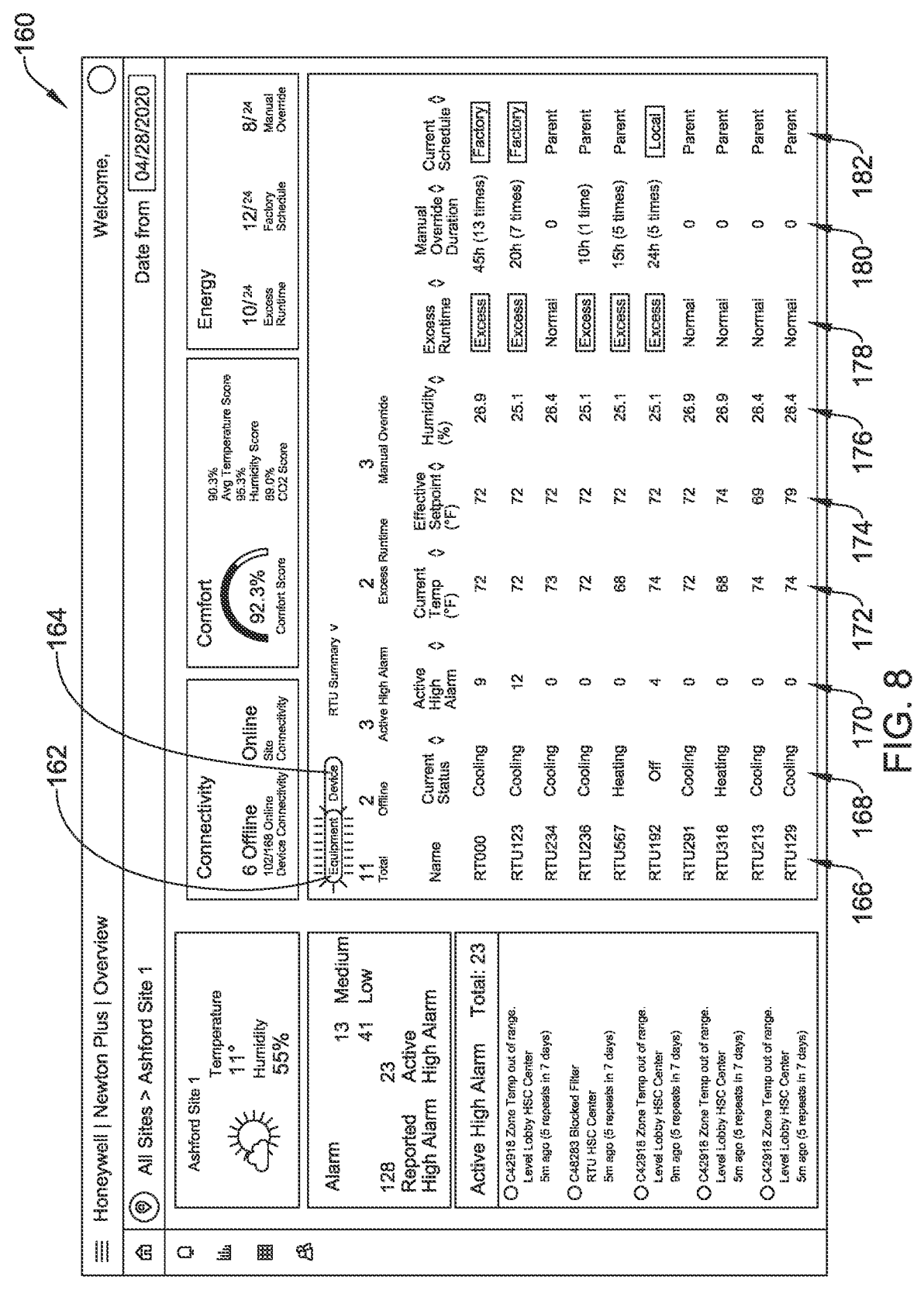
Figure 9:
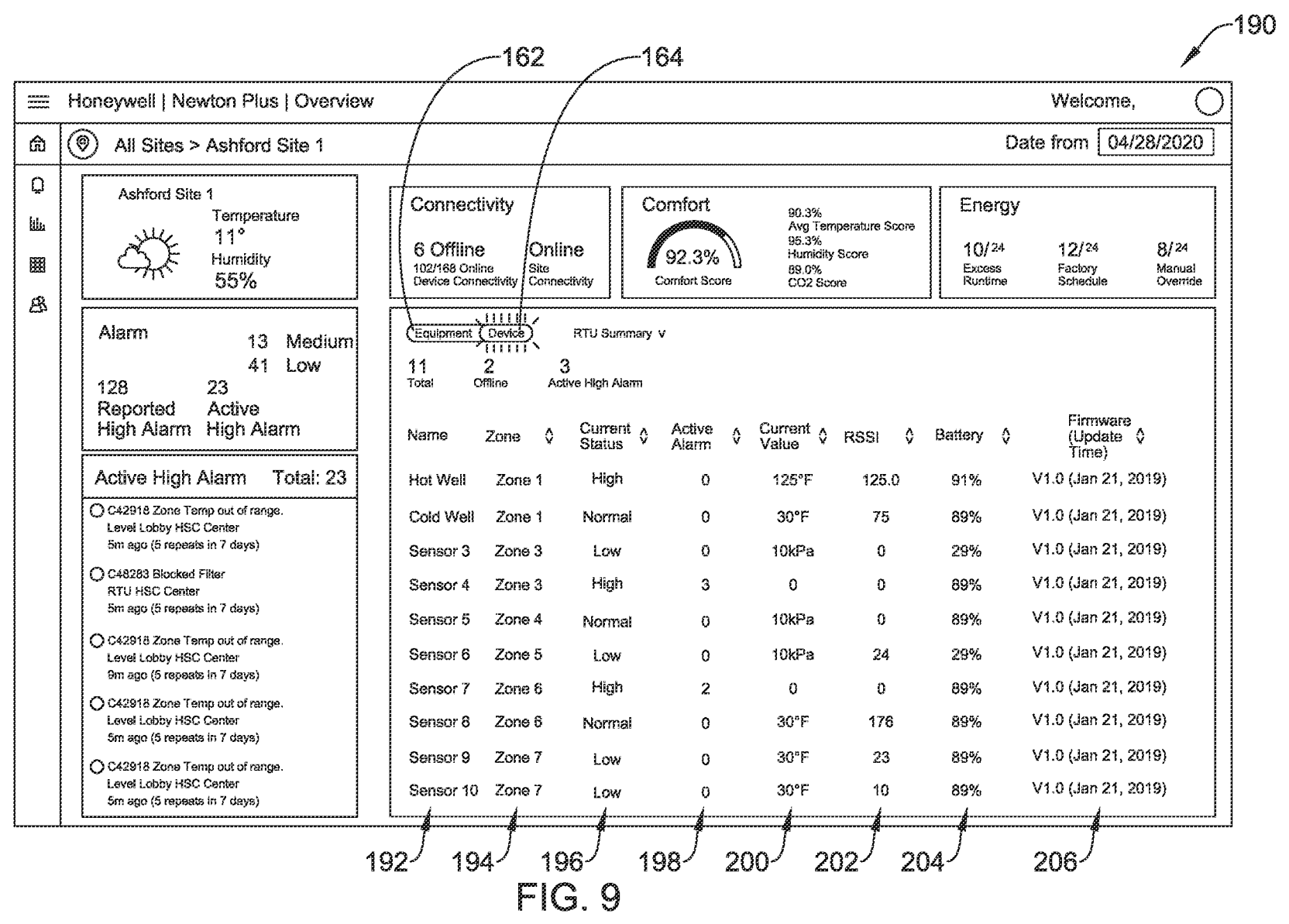

FIG. 8 shows a site level dashboard 160 that shows an equipment list view while FIG. 9 shows a site level dashboard 190 that shows a device list view. The site level dashboards 160, 190 may be reached by selecting the site on the portfolio level dashboard. In some cases, a user may enter a search query into the multi-site BMS to identify a desired remote site, and then select the site to reach the desired site level dashboards 160, 190. These are just example.

In the example shown, once the site level dashboard 160, 190 is reached, a user is able to select between the equipment list view and the device list view by toggling either an equipment view icon 162 or a device list view icon 164. The site level dashboard 160 allows a user to see all of the equipment at a particular site in a single list that allows the user to switch between different equipment types such as but not limited to RTU (roof top units), VRF (variable refrigerant flow units) and AHU (air handling units). As illustrated, roof top units have been selected. The site level dashboard 160 includes a Name column 166, a Current Status column 168, an Active High Alarm column 170, a Current Temperature column 172, an Effective Setpoint column 174, a Humidity column 176, an Excess Runtime column 178, a Manual Override Duration column 180 and a Current Schedule column 182.

The site level dashboard 190 with the device list view icon 164 selected shows information for devices such as sensors, lighting and the like. FIG. 9 shows a sensor summary list. The site level dashboard 190 includes a Name column 192, a Zone column 194, a Current Status column 196, an Active Alarm column 198, a Current Value column 200, an RSSI column 202, a Battery column 204 and a Firmware Update column 206.

Figure 10:
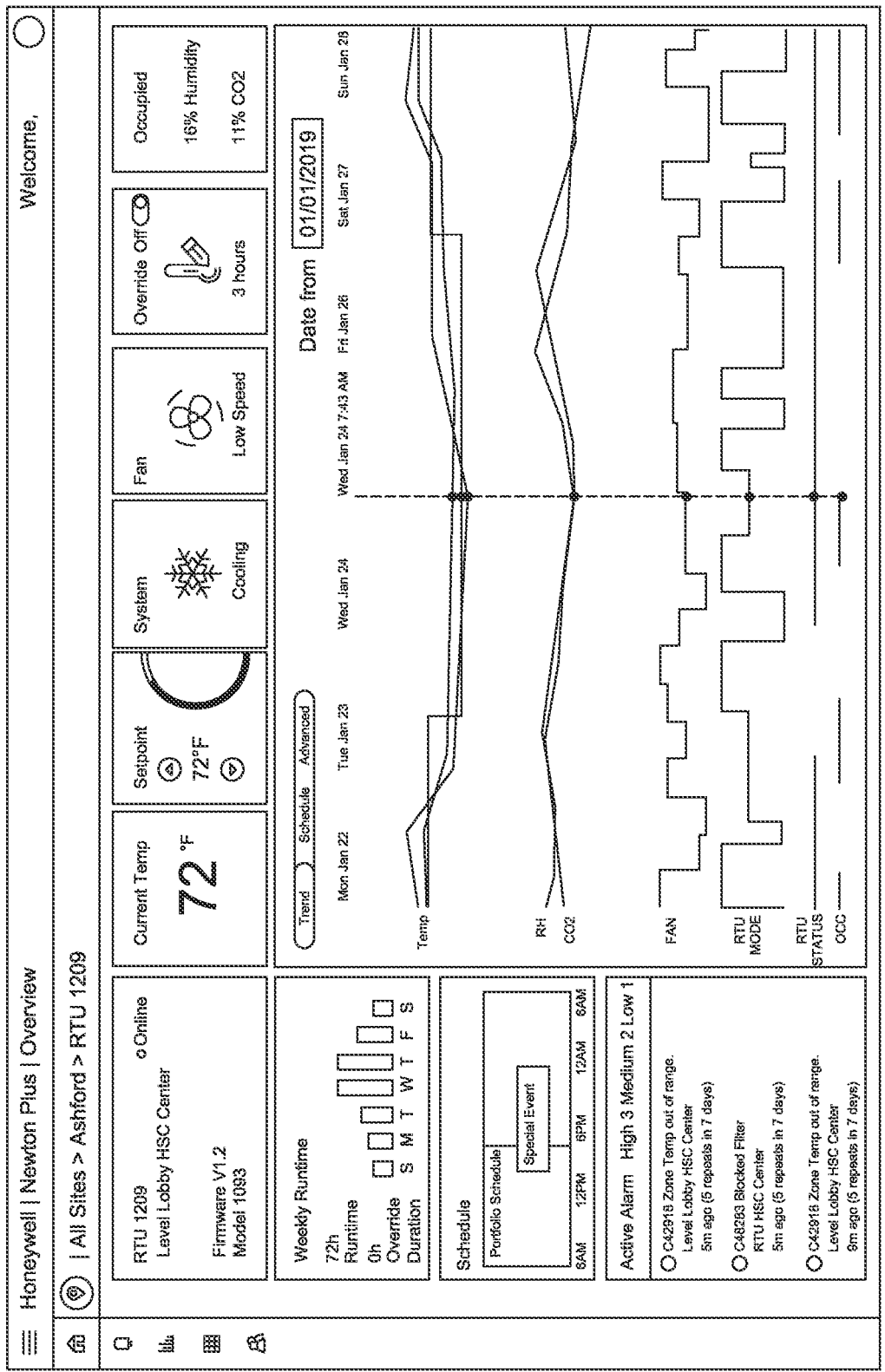

FIG. 10 provides an example of an equipment level dashboard 220 that allows a user to monitor, command and control the current status, parameter values and/or control signals for a selected piece of equipment. In some cases, a multiple objects trend view allows visualization of each parameter over time. This can provide for improved user interaction and interpretation for better trouble shooting. Scheduling of the equipment can also be seen. In some cases, the equipment level dashboard 220 may be configured to have a generic design that can adapt to any of a variety of different types of equipment without requiring additional configuration. The equipment level dashboard 220 may be reached by selecting the appropriate piece of equipment on the site level dashboard 160, for example.

Figure 11:
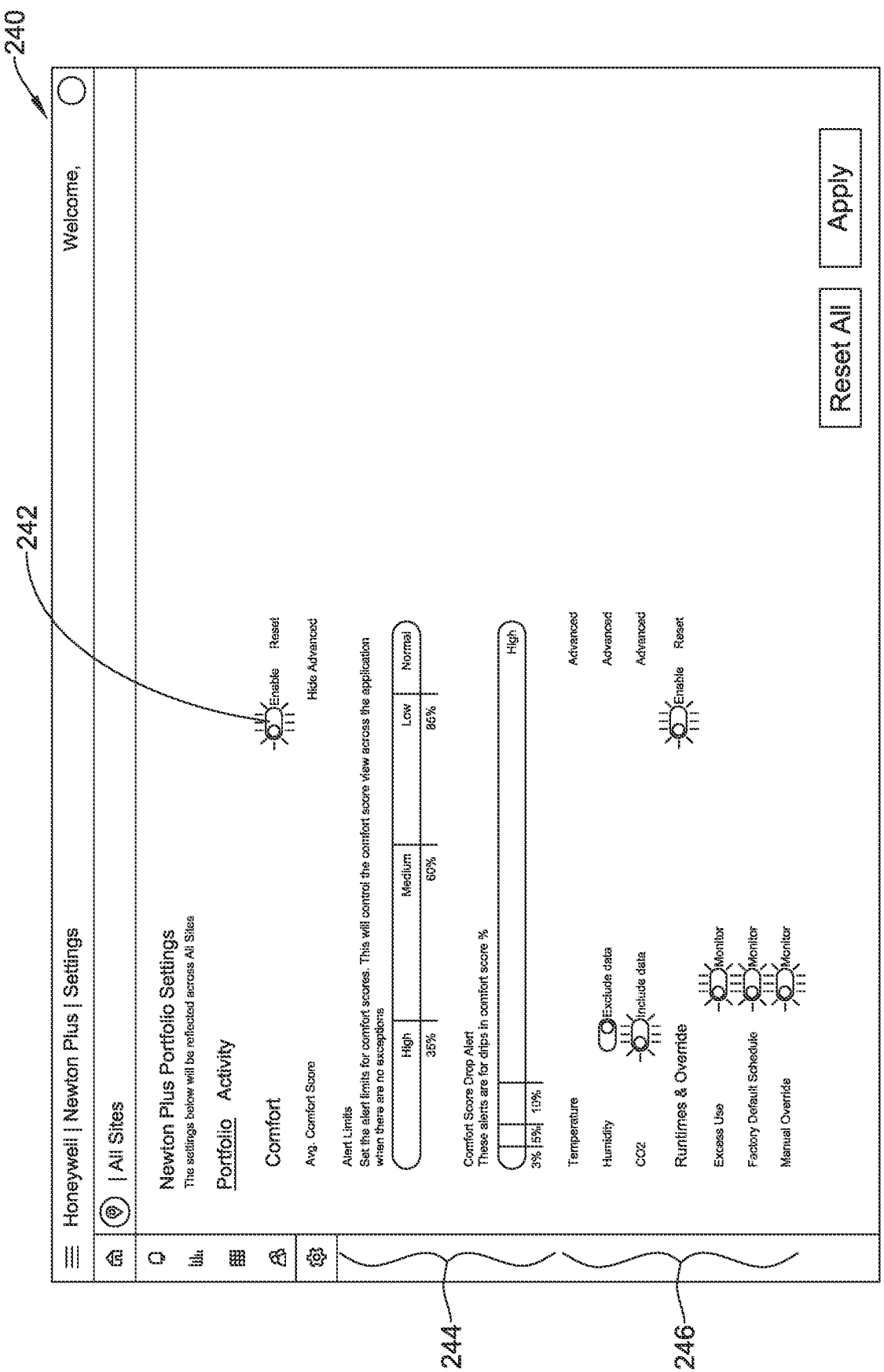

As noted, in some cases, the user may be able to specify which panels are displayed on the portfolio level dashboard 80. FIG. 11 provides a screen 240 that may be used to specify whether the Comfort panel 88 is displayed. Similar screens may be displayed (not shown) to specify whether the Alarms panel 86 and/or the Energy panel 90 will be displayed. The screen 240 includes a slider 242 that may be switched between enable and disable. If enabled, the Comfort panel 88 will be displayed. If disabled, the Comfort panel 88 will not be displayed. In some cases, if the Comfort panel 88 is not displayed, the other panels such as the Alarms panel 86 and the Energy panel 90 may be displayed over a larger portion of the screen. The screen 240 also includes a section 244 that allows the user to select alarm limits for comfort. The screen 240 also includes a section 246 that allows the user to select which particular parameters will be included in calculating overall scores.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A multi-site Building Management System (BMS) for monitoring a performance of and controlling a local BMS at each of a plurality of remote sites, wherein each of the plurality of remote sites includes a local BMS, the multi-site BMS comprising:
   a port for receiving operational data as the operational data is coming in from the local BMS of each of the plurality of remote sites;
   a display;
   a controller operatively coupled to the display and the port, the controller configured to:
      determine a plurality of local performance metrics associated with the local BMS of each of the plurality of remote sites based on the operational data, wherein the plurality of local performance metrics include different local performance metric types including:
         a first performance metric type that is associated with alarms issued by the corresponding local BMS;
         a second performance metric type that is associated with comfort provided by the corresponding the local BMS; and
         a third performance metric type that is associated with energy usage of the corresponding the local BMS;
      process each of the plurality of local performance metrics of each of the plurality of remote sites to identify one or more non-compliant local performance metrics that do not meet a corresponding predefined criteria;
      identify like ones of the plurality of local performance metrics of like performance metric type from the plurality of remote sites;
      aggregate the like ones of the plurality of local performance metrics of like performance metric type from the plurality of remote sites, resulting in at least one aggregated performance metric for each performance metric type;
      concurrently display on the display a plurality of panels, wherein each panel is defined by a visual boundary that extends around a perimeter of the respective panel, and each panel is associated with a different one of the plurality of local performance metric types;
      display in each of the plurality of panels at least one of the aggregated performance metrics associated with the corresponding performance metric type;
      display a map view concurrently with the plurality of panels, wherein the map view displays a geographical location of at least some of the plurality of remote sites;

receive via the map view a user selection of one of the plurality of remote sites via a user interface device associated with the BMS, and in response, update the display to display a site view on the display for the selected one of the plurality of remote sites, wherein the site view for the selected one of the plurality of remote sites displays at least some of the local performance metrics associated with the particular selected remote site and one or more pieces of equipment of the local BMS of the particular selected remote site;

receive via the site view of the selected one of the plurality of remote sites a selection of one or more of the pieces of equipment of the local BMS of the particular selected remote site via the user interface device associated with the BMS, and in response, update the display to display an equipment view on the display, wherein the equipment view displays additional information associated with an operation of the selected one or more pieces of equipment of the local BMS of the particular selected remote site;

determine and download one or more control commands to the local BMS of the particular selected remote site by to control one or more pieces of equipment of the corresponding local BMS to improve one or more of the non-compliant local performance metrics; and the corresponding local BMS executing the one or more downloaded control commands causing the corresponding local BMS to control one or more pieces of equipment of the corresponding local BMS to improve one or more of the non-compliant local performance metrics.

2. The multi-site Building Management System (BMS) of claim 1, wherein the controller is configured to allow a user selection of a sub-set of the plurality of remote sites via the map view, and in response, aggregate like ones of the plurality of local performance metrics of like performance metric type from only the sub-set of the plurality of remote sites, and update the display to display in each of the plurality of panels the corresponding one of the plurality of aggregated performance metrics for only the sub-set of the plurality of remote sites.

3. The multi-site Building Management System (BMS) of claim 2, wherein the sub-set of the plurality of remote sites includes two or more of the plurality of remote sites.

4. The multi-site Building Management System (BMS) of claim 1, wherein the additional information associated with the operation of the selected one of the pieces of equipment includes one or more of:
  alarms issued by the selected one of the pieces of equipment;
  sensor values associated with the operation of the select one of the pieces of equipment;
  control signals associated with the operation of the select one of the pieces of equipment; and
  a schedule associated with the select one of the pieces of equipment.

5. The multi-site Building Management System (BMS) of claim 1, wherein the controller is configured to classify each of the plurality of local performance metrics of each of the plurality of remote sites that do not meet the corresponding predefined criteria as needing attention.

6. The multi-site Building Management System (BMS) of claim 5, wherein the controller is configured to aggregate like ones of the plurality of local performance metrics of like performance metric type from the plurality of remote sites that are classified as needing attention, and display an indication of the aggregation of those needing attention on the corresponding one of the plurality of panels.

7. The multi-site Building Management System (BMS) of claim 1, wherein aggregating comprises one or more of:
  averaging like ones of the plurality of local performance metrics of like performance metric type from the plurality of remote sites;
  summing like ones of the plurality of local performance metrics of like performance metric type from the plurality of remote sites; and
  computing a score based on like ones of the plurality of local performance metrics of like performance metric type from the plurality of remote sites.

8. The multi-site Building Management System (BMS) of claim 1, wherein:
  a first one of the plurality of panels is associated with the first local performance metric type; and
  a second one of the plurality of panels is associated with the second local performance metric type.

9. A non-transient computer readable medium storing thereon instructions that when executed by a processor cause the processor to:
  determine a plurality of local performance metrics associated with a local BMS of each of a plurality of remote sites based on operational data, wherein the plurality of local performance metrics include different local performance metric types including:
    a first performance metric type that is associated with alarms issued by the corresponding local BMS;
    a second performance metric type that is associated with comfort provided by the corresponding the local BMS; and
    a third performance metric type that is associated with energy usage of the corresponding the local BMS;
  process each of the plurality of local performance metrics of each of the plurality of remote sites to identify one or more non-compliant local performance metrics that do not meet a corresponding predefined criteria;
  identify like ones of the plurality of local performance metrics of like performance metric type from the plurality of remote sites;
  aggregate like ones of the plurality of local performance metrics of like performance metric type from the plurality of remote sites, resulting in at least one aggregated performance metric for each performance metric type;
  concurrently display on a display a plurality of panels, wherein each panel is defined by a visual boundary that extends around a perimeter of the respective panel, and each panel is associated with a different one of the plurality of local performance metric types;
  display in each of the plurality of panels at least one of the aggregated performance metrics associated with the corresponding performance metric type;
  display a map view concurrently with the plurality of panels, wherein the map view displays a geographical location of at least some of the plurality of remote sites;
  allow via the map view a user selection of one of the plurality of remote sites via a user interface device;
  in response to selection of one of the plurality of remote sites via the map view, update the display to display a site view for the selected one of the plurality of remote sites that displays at least some of the local performance metrics associated with the particular selected remote site and one or more pieces of equipment of the local BMS of the particular selected remote site;

display performance indicators associated with one or more of the pieces of equipment of the local BMS of the particular selected remote site;

receive via the site view of the selected one of the plurality of remote sites a selection of one or more of the pieces of equipment of the local BMS of the particular selected remote site via the user interface device, and in response, update the display to display an equipment view that displays additional information associated with an operation of the selected one of the pieces of equipment of the local BMS of the particular selected remote site;

determine and download one or more control commands to the local BMS of the particular selected remote site to control one or more pieces of equipment of the corresponding local BMS to improve one or more of the non-compliant local performance metrics; and the corresponding local BMS executing the one or more downloaded control commands causing the corresponding local BMS to control one or more pieces of equipment of the corresponding local BMS to improve one or more of the non-compliant local performance metrics.

10. The non-transient computer readable medium of claim 9, wherein the additional information associated with the operation of the selected one of the pieces of equipment of the local BMS of the particular selected remote site includes one or more of:

alarms issued by the selected one of the pieces of equipment;

sensor values associated with the operation of the select one of the pieces of equipment;

control signals associated with the operation of the select one of the pieces of equipment; and a schedule associated with the select one of the pieces of equipment.

11. The non-transient computer readable medium of claim 9, wherein aggregating comprises one or more of:

averaging like ones of the plurality of local performance metrics of like performance metric type from the plurality of remote sites;

summing like ones of the plurality of local performance metrics of like performance metric type from the plurality of remote sites; and computing a score based on like ones of the plurality of local performance metrics of like performance metric type from the plurality of remote sites.

12. A method for monitoring a performance of a local BMS at each of a plurality of remote sites, wherein each of the plurality of remote sites includes a local BMS that includes one or more pieces of equipment, the method comprising:

determining a plurality of local performance metrics associated with a local BMS of each of a plurality of remote sites based on operational data, wherein the plurality of local performance metrics include different local performance metric types including:

a first performance metric type that is associated with alarms issued by the corresponding local BMS;

a second performance metric type that is associated with comfort provided by the corresponding the local BMS; and a third performance metric type that is associated with energy usage of the corresponding the local BMS;

processing each of the plurality of local performance metrics of each of the plurality of remote sites to identify one or more non-compliant local performance metrics that do not meet a corresponding predefined criteria;

identifying like ones of the plurality of local performance metrics of like performance metric type from the plurality of remote sites;

aggregating the like ones of the plurality of local performance metrics of like performance metric type from the plurality of remote sites, resulting in at least one aggregated performance metric for each performance metric type;

concurrently displaying on a display a plurality of panels, wherein each panel is defined by a visual boundary that extends around a perimeter of the respective panel, and each panel is associated with a different one of the plurality of local performance metric types;

displaying in each of the plurality of panels at least one of the aggregated performance metrics associated with the corresponding performance metric type;

displaying a map view concurrently with the plurality of panels, wherein the map view displays a geographical location of at least some of the plurality of remote sites;

receiving via the map view a user selection of one of the plurality of remote sites via a user interface device, and in response, updating the display to display a site view on the display for the selected one of the plurality of remote sites, wherein the site view for the selected one of the plurality of remote sites displays at least some of the local performance metrics associated with the particular selected remote site and one or more pieces of equipment of the local BMS of the particular selected remote site;

receiving via the site view of the selected one of the plurality of remote sites a selection of one or more of the pieces of equipment of the local BMS of the particular selected remote site via the user interface device, and in response, updating the display to display an equipment view on the display, wherein the equipment view displays additional information associated with an operation of the selected one or more pieces of equipment of the local BMS of the particular selected remote site; and determining and downloading one or more control commands to the local BMS of the particular selected remote site to control one or more pieces of equipment of the corresponding local BMS to improve one or more of the non-compliant local performance metrics; and the corresponding local BMS executing the one or more downloaded control commands causing the corresponding local BMS to control one or more pieces of equipment of the corresponding local BMS to improve one or more of the non-compliant local performance metrics.

13. The method of claim 12, comprising:

allowing a user selection of a sub-set of the plurality of remote sites via the map view, and in response, aggregate like ones of the plurality of local performance metrics of like performance metric type from only the sub-set of the plurality of remote sites, and updating the display to display in each of the plurality of panels the corresponding one of the plurality of aggregated performance metrics for only the sub-set of the plurality of remote sites.

14. The method of claim 12, wherein the additional information includes one or more of:

alarms issued by the selected one of the pieces of equipment;
sensor values associated with the operation of the select one of the pieces of equipment;
control signals associated with the operation of the select one of the pieces of equipment; and
a schedule associated with the select one of the pieces of equipment.

\* \* \* \* \*